US008804608B1

(12) United States Patent (10) Patent No.: US 8,804,608 B1
Sapp et al. (45) Date of Patent: Aug. 12, 2014

(54) METHODS, APPARATUS, AND SYSTEMS FOR FACILITATING AUDIO COMMUNICATIONS BETWEEN DISPARATE DEVICES

(75) Inventors: Jeffrey K. Sapp, Carrollton, GA (US); Jason Sapp, Carrollton, GA (US)

(73) Assignee: Lockheed Martin Corporation, Bethesda, MD (US)

( * ) Notice: Subject to any disclaimer, the term of this patent is extended or adjusted under 35 U.S.C. 154(b) by 250 days.

(21) Appl. No.: 13/216,603

(22) Filed: Aug. 24, 2011

Related U.S. Application Data

(60) Provisional application No. 61/387,822, filed on Sep. 29, 2010.

(51) Int. Cl.
*H04J 3/08* (2006.01)
*H04W 84/22* (2009.01)
*H04W 84/18* (2009.01)
*H04L 12/18* (2006.01)

(52) U.S. Cl.
CPC .............. *H04W 84/22* (2013.01); *H04W 84/18* (2013.01); *H04L 12/18* (2013.01)
USPC ........................................................ 370/326

(58) Field of Classification Search
CPC ....... H04W 84/18; H04W 84/22; H04L 12/18
USPC .......................................... 370/326, 536, 493
See application file for complete search history.

(56) References Cited

U.S. PATENT DOCUMENTS

| | | | |
|---|---|---|---|
| 6,104,709 A * | 8/2000 | Rinchiuso et al. ............ 370/335 |
| 6,198,920 B1 | 3/2001 | Doviak et al. |
| 6,327,342 B1 * | 12/2001 | Mobley et al. .................. 379/45 |
| 6,453,038 B1 * | 9/2002 | McFarlane et al. ....... 379/265.05 |
| 6,683,870 B1 * | 1/2004 | Archer ........................... 370/356 |
| 6,931,010 B2 | 8/2005 | Gallant et al. |
| 7,024,548 B1 | 4/2006 | O'Toole, Jr. |
| 7,123,910 B2 | 10/2006 | Lucidarme et al. |
| 7,486,684 B2 | 2/2009 | Chu et al. |
| 7,515,595 B2 | 4/2009 | Nanda et al. |
| 7,724,743 B2 * | 5/2010 | Razdan et al. ................. 370/392 |
| 7,738,407 B2 * | 6/2010 | Chow et al. .................... 370/259 |
| 7,782,826 B2 * | 8/2010 | Olivier et al. ................. 370/338 |
| 7,911,965 B2 | 3/2011 | Bergstrom et al. |
| 7,966,648 B2 | 6/2011 | Park et al. |
| 8,135,001 B1 * | 3/2012 | Barreiro ......................... 370/352 |
| 8,144,591 B2 | 3/2012 | Ghai et al. |
| 8,179,820 B2 * | 5/2012 | Chow et al. .................... 370/259 |
| 8,204,502 B2 | 6/2012 | Khetawat et al. |
| 2004/0184584 A1 * | 9/2004 | McCalmont et al. ........... 379/45 |
| 2008/0205321 A1 | 8/2008 | Martinez |
| 2009/0168685 A1 | 7/2009 | Olivier et al. |
| 2010/0135197 A1 | 6/2010 | Martinez |
| 2010/0195578 A1 * | 8/2010 | Razdan et al. ................. 370/328 |

OTHER PUBLICATIONS

Unknown, "C-Soft Voice over IP Software Dispatch Console," Vega, TELEX Communications, Inc., Accessed Jun. 5, 2011, 2 pages.
Uknown, "Model IP-223 Dual IP Remote Adapter Panel," Vega, TELEX Communications, Inc., Accessed May 31, 2011, 4 pages.
Unknown, "Model IP223 Ethernet Remote Panel," Vega, TELEX Communications, Inc., P.N. 803641 Revision G, Jun. 2005, 53 pages.
Non-final Office Action for U.S. Appl. No. 13/216,656 mailed Jun. 5, 2013, 18 pages.
Final Office Action for U.S. Appl. No. 13/216,656 mailed Oct. 22, 2013, 18 pages.
Applicant-Initiated Interview Summary for U.S. Appl. No. 13/216,656 mailed Dec. 6, 2013, 3 pages.
Notice of Allowance for U.S. Appl. No. 13/216,656 mailed Dec. 12, 2103, 10 pages.

* cited by examiner

*Primary Examiner* — Phuc Tran
(74) *Attorney, Agent, or Firm* — Withrow & Terranova,PLLC

(57) ABSTRACT

An access node for facilitating communications between disparate devices is disclosed. The access node includes an access communication device (ACD) interface configured to connect to an ACD and a network interface configured to communicate with a network. The access node provides configuration information associated with the ACD to an edge device coupled to the network in a common format irrespective of a native format in which the configuration information is maintained by the ACD, and facilitates modification of configuration parameters of the ACD by the edge device. The access node also facilitates audio communications between the ACD and one or more edge devices irrespective of the location of such edge devices, or of differences between the manners of audio signaling of the ACD and the edge devices.

22 Claims, 14 Drawing Sheets

METHODS, APPARATUS, AND SYSTEMS FOR FACILITATING AUDIO COMMUNICATIONS BETWEEN DISPARATE DEVICES

RELATED APPLICATION

This application claims the benefit of provisional patent application Ser. No. 61/387,822, filed Sep. 29, 2010, the disclosure of which is hereby incorporated herein by reference in its entirety.

FIELD OF THE DISCLOSURE

Embodiments disclosed herein relate to a distributed communication platform, and in particular to a distributed communication platform that facilitates communications between different types of communication devices.

BACKGROUND

Effective radio communications are critical for personnel responding to emergency situations, for the safety of the responders and affected civilians and to ensure a rapid and effective response. Unfortunately, it is not uncommon for responders from different agencies to utilize different radio platforms which either cannot interoperate with one another, or require significant reprogramming in order to do so, delaying the ability for different personnel from different agencies to communicate with one another.

Another impediment that arises is that each radio platform has a particular control panel, or console, function that is tailored to the radios and architecture of the respective radio platform. It is frequently difficult or impossible for a control console used to control communications over one platform to control a radio connected to another platform.

It is also possible for personnel from two different agencies that utilize different radio platforms to arrive at an emergency situation and discover that both agencies use the same frequencies for communications, causing confusion and interference with each other. Retasking multiple radios from one frequency to another can be a time-consuming and laborious process. Moreover, in some situations, it would be beneficial if certain individuals from some agencies could communicate with other individuals from other agencies, and thus utilize radios programmed to communicate over the same frequencies. Coordinating the reprogramming of radios from different agencies that utilize different radio platforms similarly requires time-consuming coordination among different individuals.

Accordingly, there is a need for a communication platform that facilitates communications between different types of radios, can rapidly reprogram multiple radios of different radio types to operate at different frequencies, and can control the different types of radios from a single control platform.

SUMMARY

Embodiments disclosed herein relate to a communication platform that, among other features, facilitates communications between a wide variety of disparate types of communication devices, facilitates control of such devices by network connected devices, and enables rapid reprogramming and retasking of individual devices or groups of devices in an intuitive manner.

In one embodiment, an access node facilitates control signaling between an access communication device (ACD), such as a tactical radio, that is directly connected to the access node, and an edge device, such as a computer tablet, that is communicatively coupled to a network. The access node includes a first ACD interface that is configured to connect to the ACD and a network interface that is configured to communicate with a network. The access node can obtain configuration parameters from the ACD, and store the configuration parameters in a memory of the access node. An edge device that is coupled to the network sends a request to the access node for one or more of the configuration parameters associated with the ACD.

The access node, upon receipt of the request, obtains the configuration parameters from the memory, and provides the configuration parameters to the edge device. In one embodiment, the access node may format the configuration parameters into a common format using a common control protocol prior to sending the configuration parameters to the edge device. Because the access node can connect to a wide variety of disparate types of ACDs, each of which may have its own native format for control signaling, the use of a common control protocol between the access node and an edge device eliminates the need for an edge device to be concerned with each potentially different native format for each disparate type of ACD.

The edge device may present the configuration parameters to a user of the edge device, and receive an indication from the user that one or more of the configuration parameter values of the ACD should be altered. The edge device generates a common control command in the common format and sends the common control command to the access node that connects to the ACD. The access node receives the common control command, and generates a native control command in a native format that is different from the common control command to alter the configuration parameter value of the configuration parameter. The access node then communicates the native control command to the ACD via the ACD interface to set the configuration parameter to the different configuration parameter value.

In one embodiment, the access node connects to the ACD via a serial communication port, such as an RS-232 port, and connects to the network using a packetized protocol, such as Transmission Control Protocol/Internet Protocol (TCP/IP). The access node may connect to multiple ACDs, each of which may be of a different type and manufactured by a different manufacturer. The access node may store in the memory configuration parameters from each of the different ACDs. The access node may also store in the memory information identifying native commands used by each ACD connected to the access node, so that the access node can convert or otherwise translate common control commands received from an edge device into a corresponding native command for processing by an ACD, as well as translate configuration information received from the ACDs into a common format that can be understood by the edge device.

In another embodiment, the access node facilitates audio communications between an ACD and one or more edge devices. In particular, the access node can receive incoming audio signals from a first ACD connected to the access node via a first ACD interface. The access node generates a first outgoing packetized voice stream based on the first incoming audio signals, and multicasts the outgoing packetized voice stream over the network by addressing the packetized voice stream to a first multicast address associated with the first ACD. The edge device subscribes to the first multicast address, and receives the packetized voice stream. The edge device extracts the audio signals from the packetized voice stream, and renders the audio signals to the user of the edge device.

The user may indicate to the edge device via a user interface (UI) a desire to provide voice communications to the ACD. The user begins to speak, and the edge device captures the audio signals of the user and generates a packetized voice stream carrying the audio signals of the user. The edge device addresses the packetized voice stream to the access node. The access node receives the packetized voice stream via the network, extracts the audio signals of the user, and generates outgoing audio signals. The access node provides the outgoing audio signals to the ACD. In this manner, the access node can facilitate audio communications between one or more connected ACDs and one or more edge devices that may be located anywhere in the world.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Embodiments disclosed herein relate to a communication platform that, among other features, facilitates communications between a wide variety of disparate types of communication devices, facilitates control of such devices by network connected devices, and enables rapid reprogramming and retasking of individual devices or groups of devices in an intuitive manner.

Figure 1:
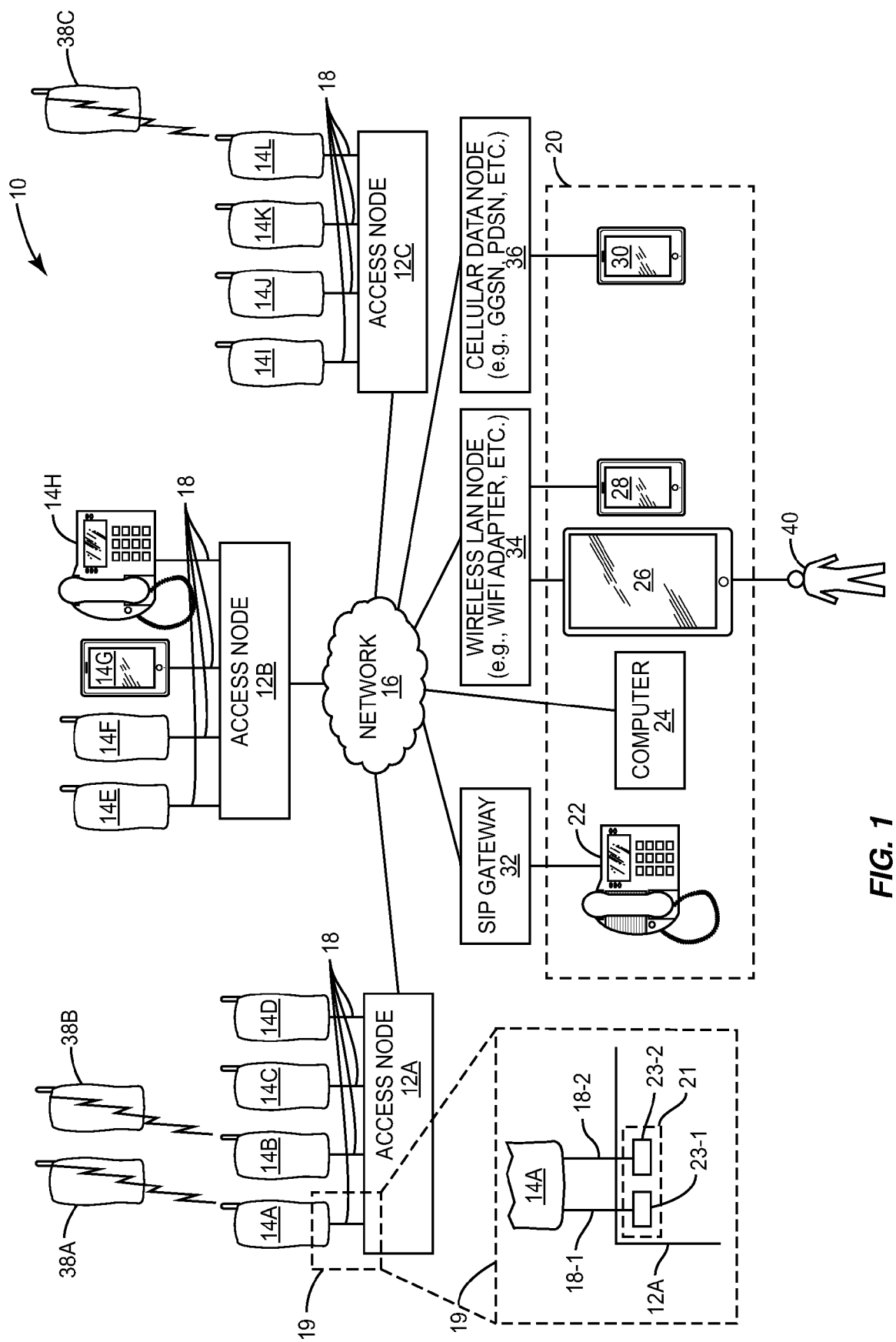
FIG. 1 is a high-level block diagram of an exemplary system in which embodiments disclosed herein may be practiced.

FIG. 1 is a high-level block diagram of an exemplary system 10 in which embodiments disclosed herein may be practiced. The system 10 includes a plurality of access nodes 12A-12C (generally, access nodes 12), each of which is connected to one or more access communication devices (ACDs) 14A-14L (generally, ACDs 14). The ACDs 14 may comprise, for example, analog or digital tactical re-programmable radios, such as those used by governmental agencies; land mobile radios; telephones; or any other device capable of voice communications. As used herein, the phrase "access communication device" means any such ACD 14, irrespective of the type of ACD 14, which is directly connected to an access node 12.

Each access node 12 is communicatively coupled to a network 16, which may comprise any combination of public or private networks, including virtual private networks, and may utilize any combination of wired or wireless communications technologies.

The access nodes 12 are connected to respective ACDs 14 via one or more communication links 18. Each access node 12 includes a plurality of ACD interfaces, each of which is configured to communicate via an audio channel with a respective ACD 14, and via a control channel with the respective ACD 14. While for purposes of illustration only a single communication link 18 is shown between each ACD 14 and a respective access node 12 throughout the Figures, as shown in view 19, an ACD 14, such as the ACD 14A, may connect to a respective access node 12 via multiple communication links 18. In particular, an ACD interface 21 may include both an audio channel interface 23-1 and a control channel interface 23-2. The audio channel interface 23-1 is configured to communicate via an audio channel over an audio communication link 18-1. In one embodiment, the audio channel interface 23-1 is an analog audio channel interface, and the audio communication link 18-1 may comprise an analog communication link. The audio communication link 18-1 may couple to the ACD 14A via, for example, an analog audio port of the ACD 14A, such as integral or separate line in/line out ports, or integral or separate microphone/speaker ports.

The control channel interface 23-2 is configured to communicate via a control channel over a control channel communication link 18-2. In one embodiment, the control channel interface 23-2 is a serial control channel interface, and the control channel communication link 18-2 may comprise a serial communication link, such as an RS-232 communication link. The control channel communication link 18-2 may couple to the ACD 14A via, for example, an RS-232 port of the ACD 14A.

The ACD interface 21 may be implemented by a combination of software and circuitry suitable for implementing the desired types of audio and control channels between the access node 12A and the ACD 14A. As will be discussed in greater detail herein, one notable advantage of the access node 12A, implemented in part via the ACD interface 21, is to integrate an ACD 14 that may not have been designed to interoperate with a packetized network, such as the network 16, into the network 16. Such integration, as will be discussed in greater detail herein, not only permits communications between an ACD 14 and other devices located anywhere in the world, but enables such other devices to reconfigure, or retask, an ACD 14 from any location in the world.

Preferably, each of the access nodes 12 is individually addressable and may be addressed by any other network-attached device via, for example, an IP address associated with the respective access node 12. The access node 12 may be implemented in various hardware form factors, such as a single device, as illustrated in FIG. 1, or functionality may be divided among multiple devices, as illustrated herein in FIG. 2. In one embodiment, one or more of the ACDs 14 are analog audio devices, such as an analog radio frequency tactical radio, and are not directly addressable via the network 16.

As will be described in detail below, the access node 12 facilitates a variety of communications between an ACD 14 and other devices coupled to the network 16. Such other devices may comprise other ACDs 14 that are connected to other access nodes 12. For example, the access node 12A may facilitate communications between the ACD 14A and one or more of the ACDs 14E-14L.

The access node 12 may also facilitate communications between an ACD 14 and one or more edge devices 20. Edge devices 20 are communication devices that are communicatively coupled to the network 16 via mechanisms other than an access node 12, and generally communicate over the network 16 via a packetized communication protocol, such as TCP/IP. Exemplary edge devices 20 include a session initiation protocol (SIP) telephone 22; a computer 24, such as a laptop or desktop computer; a computer tablet 26, such as an Apple® iPad® tablet, Samsung Galaxy tablet, BlackBerry® PlayBook tablet, or the like; and smartphones 28, 30, such as an Apple® iPhone® smartphone, Android™ smartphone, or other suitable smartphone capable of accessing both a cellular network and a data network, and running software applications thereon.

Edge devices 20 may be communicatively coupled to the network 16 directly, or through conventional routing nodes. For example, the SIP telephone 22 may be communicatively coupled to the network 16 via a SIP gateway 32, the computer tablet 26 and the smartphone 28 may be communicatively coupled to the network 16 via a wireless LAN node 34, and the smartphone 30 may be communicatively coupled to the network 16 via a cellular data node 36. Each of the edge devices 20 is network addressable and comprises a unique network address, or offers a unique network address through a firewall (not shown), by which it may be addressed.

In one embodiment, an access node 12 facilitates audio communications between an ACD 14 and other devices not directly connected to the access node 12. For example, assume that the ACD 14A comprises a tactical radio, and receives a radio transmission comprising an audio signal from a remote radio 38A on a first receive frequency. The ACD 14A communicates the audio signal to the access node 12A via the communication link 18. The audio signal may be an analog audio signal or a digital audio signal, depending on the type of ACD 14A. The access node 12A receives the incoming audio signal; converts, or otherwise translates, the incoming audio signal into an outgoing packetized voice stream comprising a plurality of packets; and transmits the outgoing packetized voice stream onto the network 16 for receipt by one or more other devices. The words "incoming" and "outgoing" may be used herein simply for the purposes of distinguishing one element from another element, and to the extent used, shall be from the perspective of the device that is processing the element. Thus, the incoming audio signal from the perspective of the access node 12A is an outgoing audio signal from the perspective of the ACD 14A. Unless otherwise specified, the use of ordinals, such as "first," "second," or "third," in conjunction with an element, such as "first receive frequency," is merely for distinguishing between elements and does not imply a priority, order, or importance.

In one embodiment, the access node 12A maintains a corresponding multicast address for each of the ACDs 14A-14D, for use in facilitating audio communications between a respective ACD 14A-14D and other devices not connected to the access node 12A. Thus, in this example, the access node 12A multicasts the outgoing packetized voice stream that carries the audio signal received by the ACD 14A via the multicast address associated with the ACD 14A. Such multicast addresses, such as IP multicast addresses, for example, may be configured into the access node 12A via a console of the access node 12A, such as via the use of selector buttons on a front of the access node 12A, or, as discussed in greater detail herein, may be configured over the network 16 via a control panel function executing on an edge device 20. The term "multicast" as used herein refers to a packet-addressing mechanism that facilitates receipt of such packets by a group of interested edge devices 20. In one embodiment, multicasting is implemented herein through the use of IPv4 or IPv6 multicast addresses.

Any edge device 20 that desires to receive the outgoing packetized voice stream may simply subscribe to the respective multicast address. For example, assume that the computer tablet 26 is used by a user 40 who is an emergency responder. The user 40 desires to hear the audio transmissions received by the ACD 14A, which may comprise, for example, a tactical radio programmed to operate on a transmit and receive frequency that has been designated for use by a category of emergency responders, such as first aid responders. Initially, the computer tablet 26 may present to the user 40 in a user interface (UI) a selectable list of ACD identifiers, each of which identifies one of the ACDs 14 by name, function, or by any other suitable identifier. The user 40 may select the ACD identifier corresponding to the ACD 14A. In response, the computer tablet 26 subscribes to the multicast address that is associated with the selected ACD 14A. Such multicast address may be manually configured into the computer tablet 26, or the computer tablet 26 may obtain the multicast addresses associated with the ACDs 14 via a configuration server coupled to the network 16 (not illustrated). The computer tablet 26 begins to receive the packetized voice stream that is transmitted by the access node 12A to the multicast address associated with the ACD 14A. The computer tablet 26 includes a voice codec that receives the packetized voice stream, decodes the audio signals from the packetized voice stream, encodes the audio signals into a format suitable for rendering on the computer tablet 26, and provides the encoded audio signals to an audio output port which may be coupled to a playback device, such as an audio speaker or headset, of the computer tablet 26 for presentation to the user 40.

Notably, because the packetized voice stream is multicast by the access node 12A, any of the edge devices 20 may concurrently receive the packetized voice stream by subscribing to the corresponding multicast address. Moreover, an edge device 20 may subscribe to multicast addresses associated with multiple ACDs 14 simultaneously, and thereby concurrently monitor multiple conversations. Assume, for example, that the ACD 14B has been programmed to operate on a different receive and transmit frequency than those on which the ACD 14A are programmed, such frequencies being used by a different category of responders, such as firefighters. The ACD 14B may receive an audio signal from a remote radio 38B used by a firefighter. The ACD 14B provides the audio signal to the access node 12A. Such audio signals may comprise analog audio signals or digital audio signals. The access node 12A generates a packetized voice stream from the audio signals, addresses the packets of the packetized voice stream to the multicast address associated with the ACD 14B, and multicasts the packetized voice stream onto the network 16.

The user 40 may desire to hear the communications associated with firefighter emergency responders, and thus may select on the computer tablet 26 the ACD identifier corresponding to the ACD 14B. In response, the computer tablet 26 subscribes to the multicast address to which the packetized voice stream carrying the audio signals received by the ACD 14B are being multicast, decodes the packetized voice stream, and renders the audio signals carried in the packetized voice stream to the user 40. The computer tablet 26 may provide the user 40 with the ability to hear only one packetized voice stream at a time, or may allow the user 40 to listen to multiple packetized voice streams generated by the access nodes 12 concurrently, enabling the user 40 to monitor the audio transmissions of multiple different categories of emergency responders.

In one embodiment, a user of an edge device 20 may also provide an audio signal to an ACD 14 for reception and playback to a user of the ACD 14, or for transmission by the ACD 14 at a particular transmit frequency. For example, assume that the user 40 desires to communicate with first aid emergency responders. The computer tablet 26 may present to the user 40 the list of ACD identifiers, as discussed above, and may further provide in conjunction with each such identifier a selectable "TALK" button, or the like. The user 40 selects the "TALK" button associated with the ACD identifier that corresponds to the ACD 14A, and begins speaking into a microphone (not illustrated) that is coupled to an audio input port of the computer tablet 26. The voice codec (not illustrated) in the computer tablet 26 receives the audio signal comprising the voice of the user 40, and generates a packetized voice stream. The computer tablet 26 addresses each packet of the packetized voice stream in a manner that identifies the ACD 14A as the intended recipient of the packetized voice stream, and transmits the packetized voice stream onto the network 16. Such address may comprise, for example, the multicast address used by the access node 12A to multicast the packetized voice stream associated with the ACD 14A, along with a user datagram protocol (UDP) port number that identifies the multicast address to the access node 12A as corresponding to the ACD 14A.

The access node 12A receives the packetized voice stream transmitted by the computer tablet 26, determines that the packetized voice stream is associated with the ACD 14A, decodes the packetized voice stream into an audio signal suitable for receipt by the ACD 14A, and provides the audio signal to the ACD 14A. If the ACD 14A is in a transmit mode, the ACD 14A may transmit the audio signal over the air to other radios tuned to a first transmit frequency, such as the remote radio 38A. If the ACD 14A is in a receive mode, the ACD 14A may render the audio signal to an audio speaker of the ACD 14A for playback to an individual in proximity to the ACD 14A. In this manner, any user of an edge device 20 may communicate with any user of an ACD 14. Notably, because the edge devices 20 are network connectable at any location, the distributed communication platform facilitates communications between personnel using an ACD 14 and a user 40 located anywhere in the world.

While the audio communications have been described herein as being between an ACD 14 and an edge device 20, the access nodes 12 also facilitate communications between disparate types of ACDs 14, and/or ACDs 14 that operate on different receive and transmit frequencies. For example, assume that the ACD 14L communicates on second receive and second transmit frequencies that are different from the first receive and transmit frequencies on which the ACD 14A communicates, and that the ACD 14L is associated with a different category of responder, such as the police. Assume further that it is desired that the first aid responders be able to communicate, for a period of time, with the police. As will be discussed in greater detail herein, to facilitate such communications, an administrator may issue a command from a control panel, or console, coupled to the network 16 that directs the access node 12C to subscribe to the multicast address that corresponds to the ACD 14A, and to provide the audio signals contained in the packetized voice stream addressed to the multicast address to the ACD 14L. Similarly, the administrator may issue a command that directs the access node 12A to subscribe to the multicast address that corresponds to the ACD 14L, and to provide the audio signals contained in the packetized voice stream addressed to the multicast address to the ACD 14A. Obviously, such commands may be a single command or multiple commands. In essence, the administrator patches the ACD 14A and the ACD 14L together.

Thereafter, the access node 12C receives a packetized voice stream transmitted by the access node 12A that carries audio signals received by the ACD 14A. The access node 12C includes a voice codec (not illustrated), which decodes the packetized voice stream to extract the audio signals, encodes the audio signals in a format suitable for receipt by the ACD 14L, and provides the encoded audio signals to the ACD 14L. The ACD 14L transmits the audio signals over the air at the second transmit frequency to a remote radio 38C for presentation to a user of the remote radio 38C.

Similarly, upon receipt of audio signals from the remote radio 38C via the second receive frequency, the ACD 14L provides the audio signals to the access node 12C. The access node 12C encodes the audio signals into a packetized voice stream, addresses the packets to a multicast address associated with the ACD 14L, and multicasts the packetized voice stream onto the network 16. The access node 12A receives the packetized voice stream, decodes the packetized voice stream, encodes the audio signals into a format suitable for receipt by the ACD 14A, and provides the encoded audio signals to the ACD 14A. The ACD 14A receives the encoded audio signals, and transmits the audio signals over the air to the remote radio 38A via the first transmit frequency for presentation to a user of the remote radio 38A.

Notably, the computer tablet 26 may also receive the packetized voice streams generated by the access nodes 12A and 12C, and present the audio signals carried in such packetized voice streams to the user 40, such that the user 40 may hear the transmissions of the users associated with the remote radios 38A and 38C. In one embodiment, the user 40 may select on the computer tablet 26 the ACD identifiers that correspond to the ACDs 14A and 14L, and indicate, e.g., via corresponding selectable "TALK" buttons as discussed above, a desire communicate with both the ACD 14A and the ACD 14L. The user 40 may then begin speaking into the microphone of the computer tablet 26. In response, the computer tablet 26 generates a packetized voice stream carrying the audio signals (e.g., the voice signals) of the user 40. The computer tablet 26 addresses the packetized voice stream to identify both the ACD 14A and the ACD 14L as the intended recipients of the packetized voice stream, and transmits the packetized voice stream on the network 16. The access nodes 12A and 12C receive the packetized voice stream, encode the audio signals in the packetized voice stream into formats suitable for the ACDs 14A and 14L, and provide the encoded audio signals to the ACDs 14A and 14L. The ACD 14A receives the encoded audio signals and transmits the audio signals over the air to the remote radio 38A via the first transmit frequency. The ACD 14L similarly receives the encoded audio signals and transmits the audio signals over the air to the remote radio 38C via the second transmit frequency. In this manner, the user 40 may communicate with any number of different ACDs 14, thus enabling the user 40 to both listen to and communicate with any or all of the ACDs 14 concurrently.

In one embodiment, a group of edge devices 20 may use a predetermined multicast address and port number to establish an intercom mode, or intercom group, wherein any edge device 20 using such predetermined multicast address and port number can communicate concurrently with every other edge device 20 that uses the same predetermined multicast address and port number. Multiple multicast addresses and port numbers may be predetermined to allow multiple concurrent intercom groups between different edge devices 20. Such predetermined multicast address and port numbers preferably differ from multicast addresses and port numbers used by an access node 12. Such intercom groups may be represented by corresponding icons on a display of an edge device 20, enabling the user to easily participate in and switch between any number of intercom groups.

In addition to audio communications, the access node 12 may also facilitate control communications between an ACD 14 and one or more edge devices 20, such that configuration parameters of an ACD 14 may be dynamically altered by an edge device 20. In one embodiment, an access node 12 may access configuration parameters of a connected ACD 14 and store such configuration parameters in a memory of the access node 12. Each configuration parameter may include both a configuration parameter type and a configuration parameter value. Configuration parameter types may include, but are not limited to, a transmit frequency, a receive frequency, a modulation mode, a transmit power, a channel, or the like. For example, a configuration parameter may comprise a transmit frequency type and have a configuration parameter value of 960 MHz.

In one embodiment, an access node 12 and an edge device 20 establish a control communication session before the access node 12 will exchange control information between a particular ACD 14 and the edge device 20. The control communication session may be a TCP/IP session, for example. Assume that the edge device 20 is configured with IP addresses associated with the access nodes 12A-12C. The edge device 20 may provide, in a UI, icons representing each of the access nodes 12A-12C. The user 40 may select, via, for example, a touch-sensitive surface of the edge device 20, the icon corresponding to the access node 12A. The edge device 20 then establishes a control communication session, such as a TCP/IP session, with the access node 12A. The edge device 20 may also send the access node 12A an initial message requesting an identification of any ACDs 14 connected to the access node 12A. As part of the control communication session establishment process, the access node 12A stores an edge device identifier, such as the TCP/IP address of the edge device 20, in a memory. In response to the initial message, the access node 12A sends a message to the edge device 20 that contains ACD identifiers that identify the ACDs 14A-14D.

The edge device 20 may use such ACD identifiers subsequently to send control commands to selected ACDs 14 that are connected to the access node 12A. Thus, in one embodiment, while audio communications between an edge device 20 and an ACD 14 are implemented using multicast addresses, control communications between an edge device 20 and an ACD 14 are implemented using unicast addresses.

In one embodiment, the access nodes 12 may include a device native command library that includes information that enables the access node 12 to both retrieve configuration parameters from an ACD 14, and to transmit new parameter values to an ACD 14. Such access may be facilitated by the manner in which the access node 12 is connected to the ACD 14. For example, assume that the control channel communication link 18-2 between the ACD 14A and the access node 12 comprises a serial RS-232 cable that is connected to an RS-232 port of the ACD 14A. Assume further that the access node 12A determines that the ACD 14A comprises an AJAX Model 22 tactical radio. This determination may be manually configured into the access node 12A, or may be determined in response to a handshake sequence between the ACD 14A and the access node 12A upon connection of the ACD 14A to the access node 12A via the RS-232 cable. The access node 12A accesses the device native command library to obtain information that identifies native commands associated with an AJAX Model 22 tactical radio. The access node 12A then issues one or more native commands to the ACD 14A to retrieve the configuration parameters of the ACD 14A, and stores such configuration parameters in a device configuration parameter library.

The access node 12A may subsequently receive a request for the configuration parameters associated with the ACD 14A from, for example, the computer tablet 26. In response, the access node 12A retrieves the configuration parameters associated with the ACD 14A from the device configuration parameter library, and provides the configuration parameters to the computer tablet 26. In response, the computer tablet 26 may present the configuration parameters to the user 40. The user 40 may view the configuration parameters, and in one embodiment may also be able to alter one or more parameter values. Generally, the user 40 may view a parameter value, decide to alter the parameter value, and enter a different parameter value into a UI of the computer tablet 26. In response, the computer tablet 26 generates a control command identifying the ACD 14A, the configuration parameter type, and the configuration parameter value, and sends the control command to the access node 12A. The access node 12A receives the control command, accesses the device configuration parameter library to obtain the native control protocol associated with the ACD 14A, translates the control command received from the computer tablet 26 into a native control command using the native control protocol, and issues the native control command to the ACD 14A via the communication link 18. The ACD 14A receives the control command, and reconfigures itself by setting the configuration parameter type equal to the identified configuration parameter value. In this manner, an edge device 20 may alter fundamental operating characteristics, such as the receive and transmit frequencies, transmit power, or the like, of an ACD 14 from any location.

The access node 12A may also access the list of edge device identifiers that identify those edge devices 20 that have established control communication sessions with the access node 12A. The access node 12A may then send each of such edge devices 20 a message indicating that the particular configuration parameter value of the configuration parameter of the ACD 14A has been altered. In this way, each edge device 20 that has established a control communication session with the access node 12A is updated with the current configuration parameter information for the ACD 14A. The edge devices 20 that receive such a message may than automatically update a display of the respective edge device 20 that identifies the new configuration parameter value in place of the previous configuration parameter value.

Figure 2:
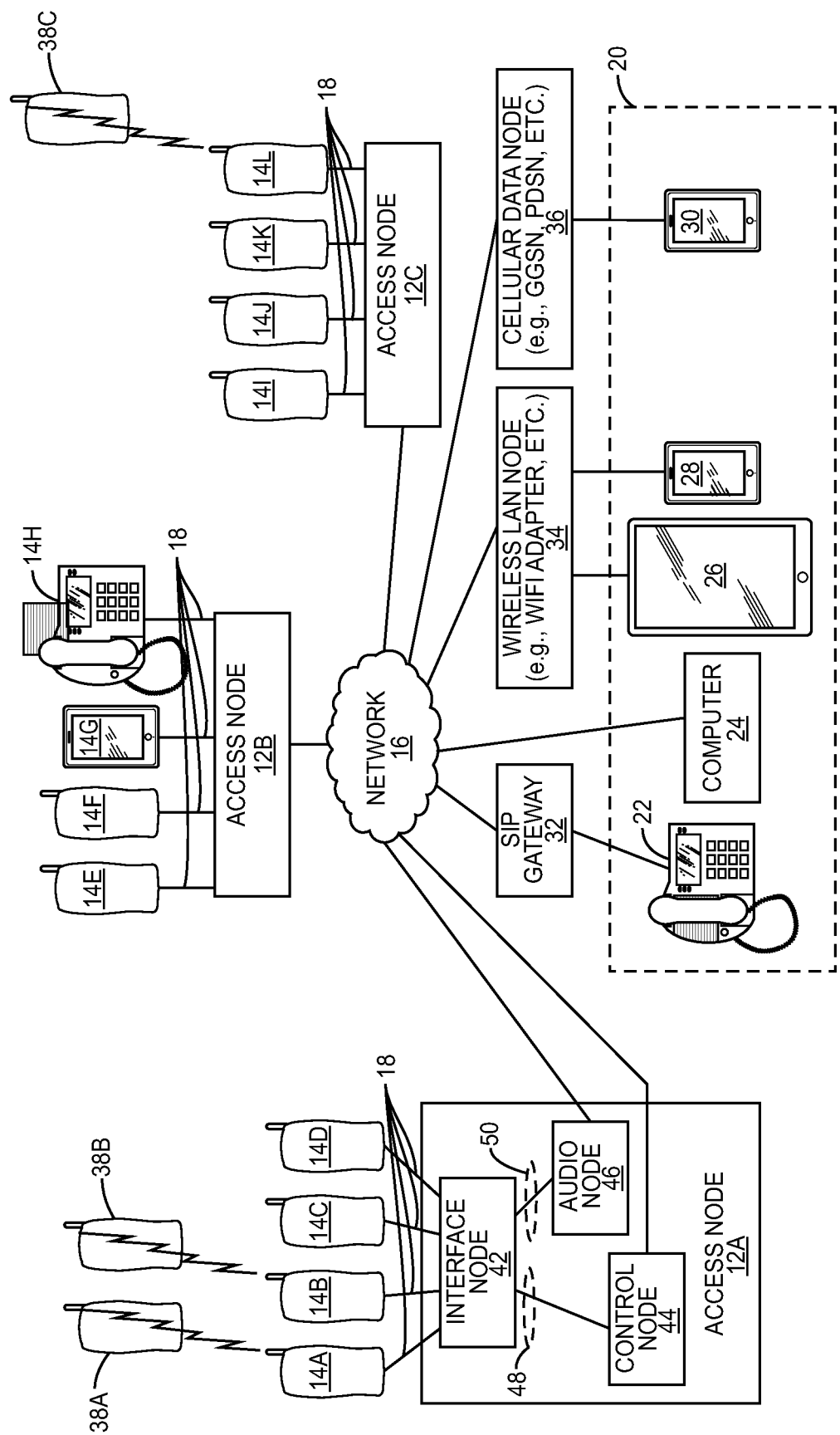
FIG. 2 is a block diagram that illustrates an exemplary access node according to one embodiment.

FIG. 2 is a block diagram that illustrates an exemplary access node 12A according to another embodiment. In this embodiment, the access node 12A comprises three different devices, an interface node 42, a control node 44, and an audio node 46. The ACDs 14A-14D are connected directly to the interface node 42 via one or more communication links 18. As discussed above, each ACD 14A-14D may be connected to the interface node 42 via multiple communication links 18, such as via both an RS-232 communication link for control signaling and a separate audio communications link for audio signaling. The interface node 42 is connected to the control node 44 via a plurality of communication links 48, each of which corresponds to a particular ACD 14A-14D. The interface node 42 is also connected to the audio node 46 via a plurality of communication links 50, each of which corresponds to a particular ACD 14A-14D, and which are used for audio communications. Each of the control node 44 and the audio node 46 may connect to the network 16, and thus may be separately network addressable.

In this embodiment, an edge device 20, such as the computer tablet 26, is aware of both the control node 44 and the audio node 46, and addresses communications to a particular control node 44 or audio node 46, depending on the nature of the communications. In particular, if the computer tablet 26 desires to send a packetized voice stream to the ACD 14A, the computer tablet 26 addresses the packets that make up the packetized voice stream to an address that is associated with the audio node 46, such as the multicast address and UDP port number used by the audio node 46 to identify the ACD 14A. If, on the other hand, the computer tablet 26 desires to alter a configuration parameter value of the ACD 14A, the computer tablet 26 may direct a control command directly to the control node 44, and uniquely identify the ACD 14A as the intended recipient of the control command.

Figure 3:
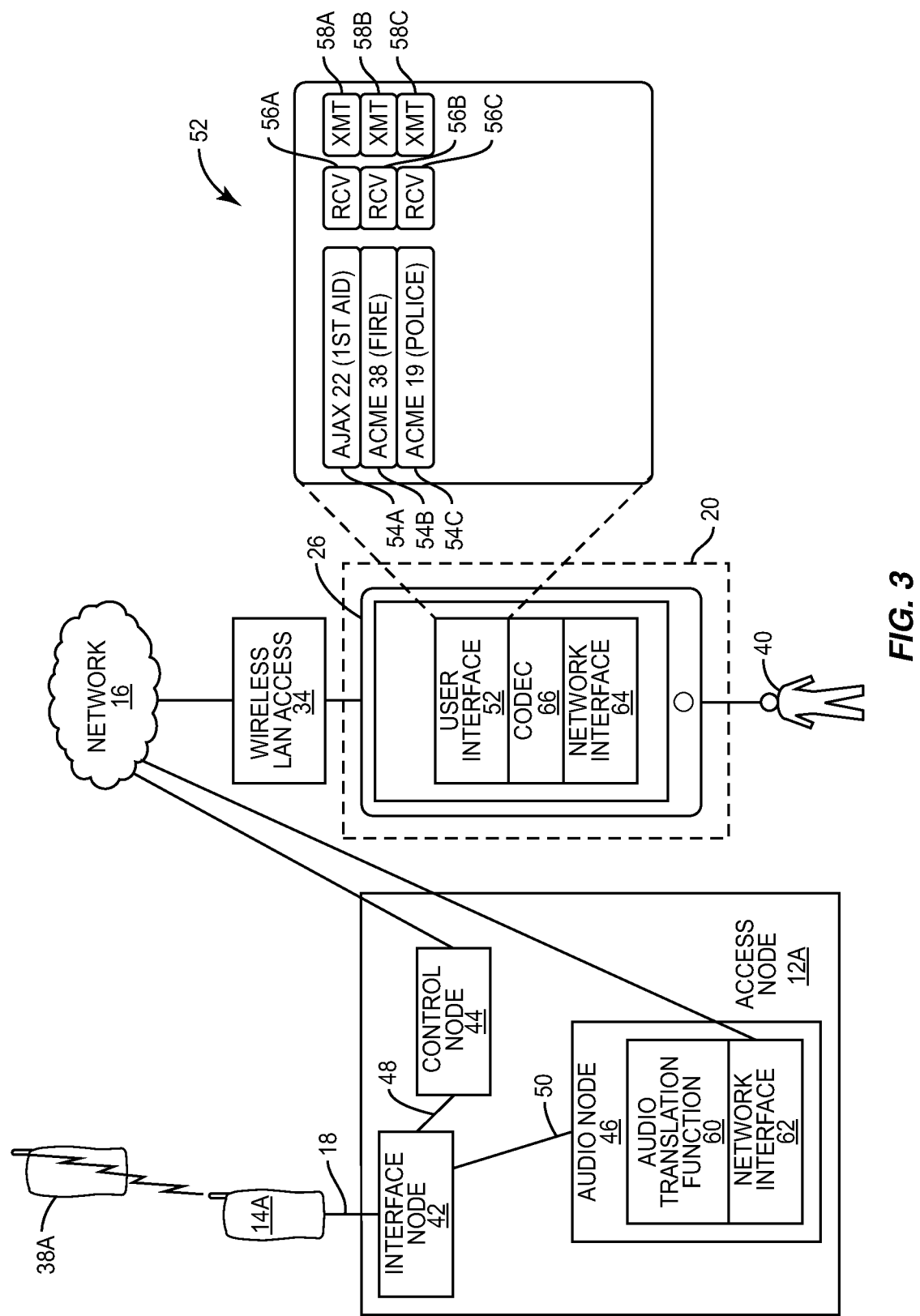
FIG. 3 is an exemplary block diagram illustrating in greater detail audio communications between an access communication device (ACD) and an edge device.
Figure 4:
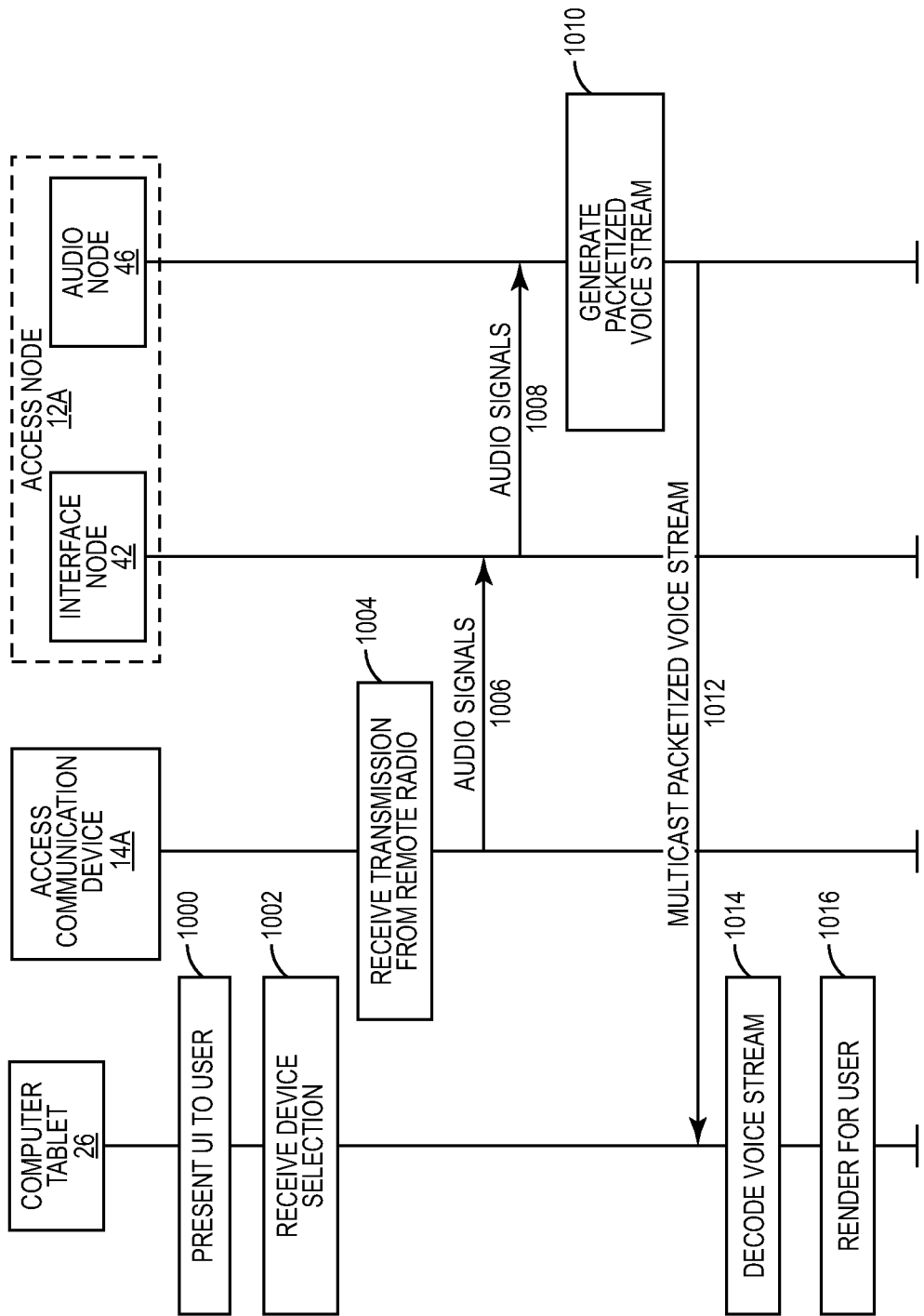
FIG. 4 is a message flow diagram illustrating an exemplary exchange of messages during audio communications between the ACD and the edge device illustrated in FIG. 3.

FIG. 3 is an exemplary block diagram illustrating in greater detail audio communications between the ACD 14A and an edge device 20. Devices and other elements depicted in FIGS. 1 and 2 that are not necessary for the discussion have been removed for ease of illustration. FIG. 4 is a message flow diagram illustrating an exemplary exchange of messages during audio communications between the ACD 14A and the edge device 20, and will be discussed in conjunction with FIG. 3.

Initially, assume that a client application executes on the computer tablet 26 which provides a UI 52 to the user 40 (FIG. 4, step 1000). The UI 52 includes various UI components for presenting information to and/or receiving information from the user 40, as well as functionality for providing information received from the user 40 to relevant modules of the client application for subsequent processing. In one embodiment, the UI 52 presents to the user 40 a plurality of ACD identifiers 54A-54C, each of which corresponds to a particular ACD 14. Assume that the ACD identifier 54A corresponds to the ACD 14A. The UI 52 may also include corresponding user-selectable receive buttons 56A-56C and user-selectable transmit buttons 58A-58C, via which the user 40 may indicate a desire to receive and/or transmit via a particular ACD 14. Assume that the user 40 selects the receive button 56A to indicate a desire to hear voice communications received by the ACD 14A (FIG. 4, step 1002). In response, the computer tablet 26 determines the multicast address associated with the ACD 14A. As mentioned previously, the computer tablet 26 may be manually configured with such information, or during an initialization phase of the client application may access a configuration server via the network 16 that identifies the various ACDs 14 and their corresponding multicast addresses. The computer tablet 26 may also initiate a message to a device on the network 16 indicating a desire to subscribe to the corresponding multicast address, or, alternatively, may simply start filtering received messages based on the corresponding multicast address. Assume that the ACD 14A subsequently receives a transmission comprising audio signals from the remote radio 38A (FIG. 4, step 1004). The ACD 14A provides the audio signals to the interface node 42 (FIG. 4, step 1006). The interface node 42 in turn provides the audio signals to the audio node 46 via the communications link 50 (FIG. 4, step 1008).

An audio translation function 60 of the audio node 46 translates the audio signals received from the interface node 42 from a native format associated with the ACD 14A to a packetized format, and generates a packetized voice stream (FIG. 4, step 1010). The audio node 46 then multicasts the packetized voice stream via a network interface 62 onto the network 16 using the multicast address associated with the ACD 14A (FIG. 4, step 1012). The computer tablet 26 receives the packetized voice stream via a network interface 64, and provides the packetized voice stream to a codec 66. The codec 66 decodes the packetized voice stream and generates audio signals suitable for rendering on the computer tablet 26 (FIG. 4, step 1014). The computer tablet 26 then renders the audio signals for the user 40, e.g., via an audio speaker (FIG. 4, step 1016).

Figure 5:
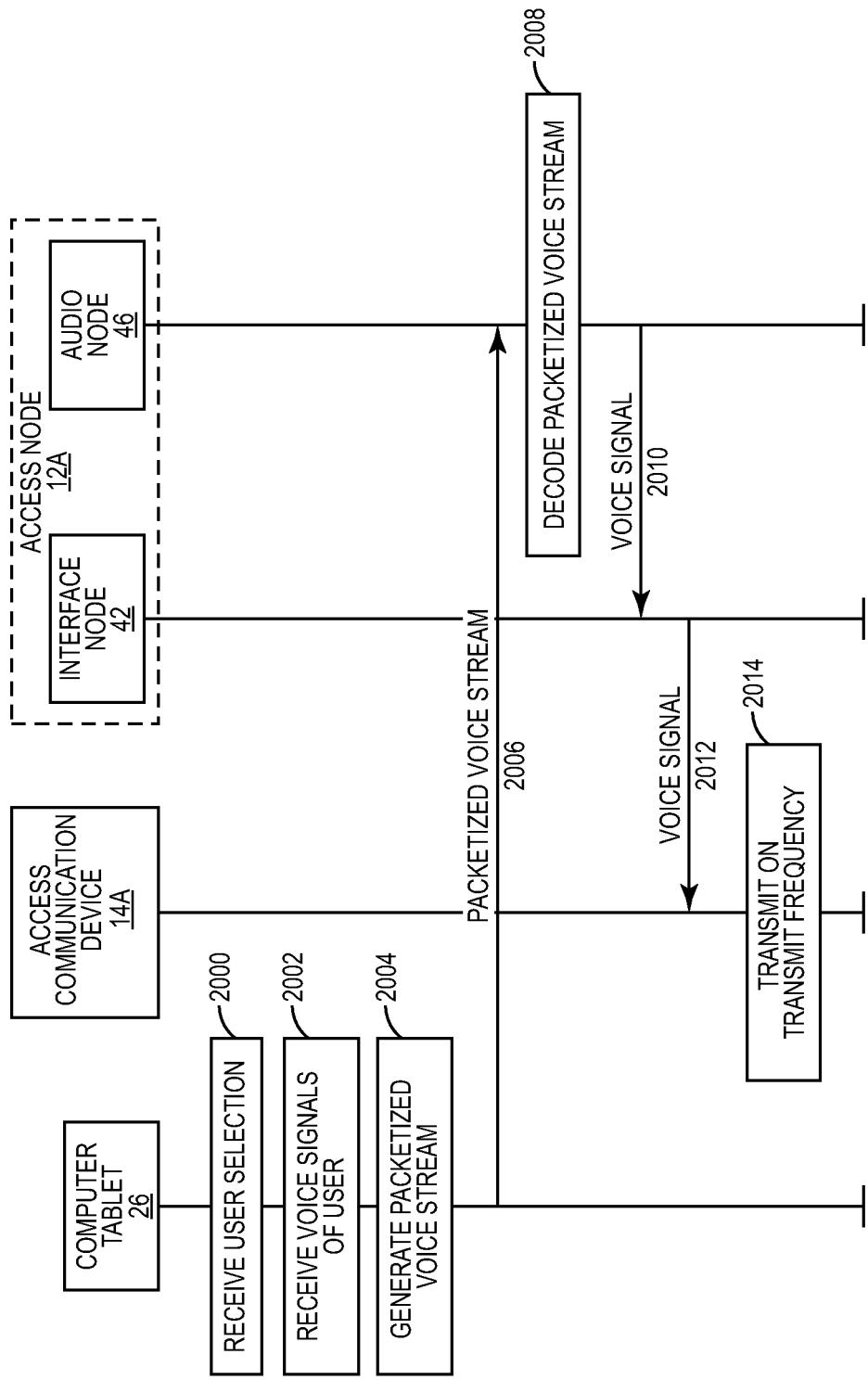
FIG. 5 is a message flow diagram illustrating an exemplary exchange of messages during audio communications that originate at an edge device and are communicated to an ACD according to one embodiment.

FIG. 5 is a message flow diagram illustrating an exemplary exchange of messages during audio communications that originate at the edge device 20 and are communicated to the ACD 14A according to one embodiment, and will be discussed in conjunction with FIG. 3. Referring first to FIG. 3, assume that the computer tablet 26 receives a user selection of the transmit button 58A indicating a desire to transmit audio signals to the ACD 14A (FIG. 5, step 2000). After such selection, the user 40 begins to speak into a microphone of the computer tablet 26, and the computer tablet 26 thereby receives the voice signals of the user 40 (FIG. 5, step 2002). The computer tablet 26 generates a packetized voice stream from the voice signals, and identifies the ACD 14A as the destination address for each packet (FIG. 5, step 2004). As discussed previously, the destination address may comprise the multicast IP address corresponding to the ACD 14A, as well as a UDP port number that uniquely identifies the ACD 14A to the audio node 46. The computer tablet 26 communicates the packetized voice stream onto the network 16 (FIG. 5, step 2006). The audio node 46 receives the packetized voice stream, decodes the packetized voice stream to extract the voice signals, and generates voice signals in a format suitable for receipt by the ACD 14A (FIG. 5, step 2008). The audio node 46 provides the voice signals to the interface node 42 (FIG. 5, step 2010). The interface node 42 then provides the voice signals to the ACD 14A (FIG. 5, step 2012). The ACD 14A then transmits the voice signals onto the first transmit frequency for receipt by any radio, such as the remote radio 38A, that is programmed or otherwise tuned to receive signals on the first transmit frequency (FIG. 5, step 2014).

Figure 6:
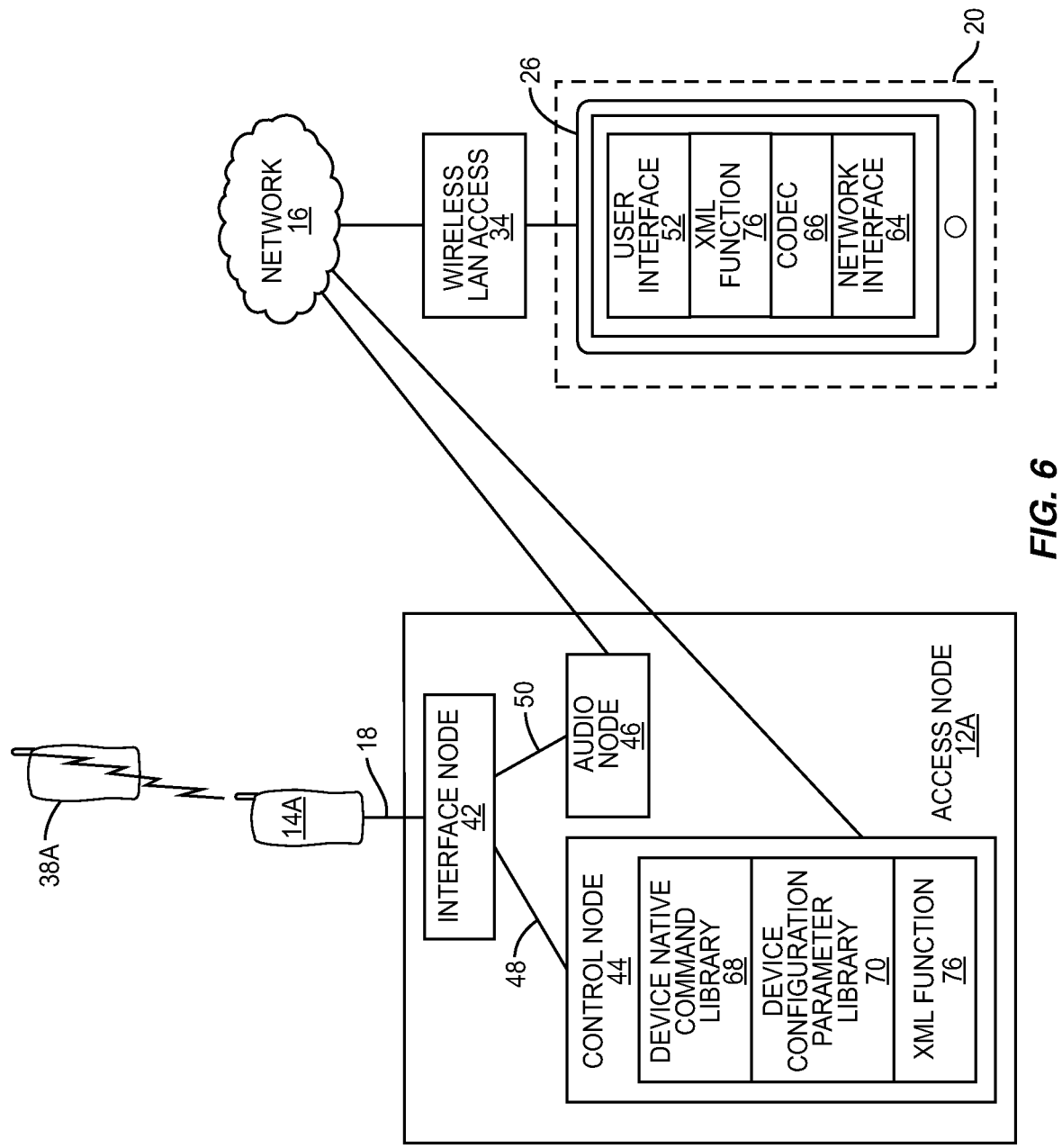
FIG. 6 is an exemplary block diagram illustrating in greater detail control signal communications between an ACD and an edge device.
Figure 7:
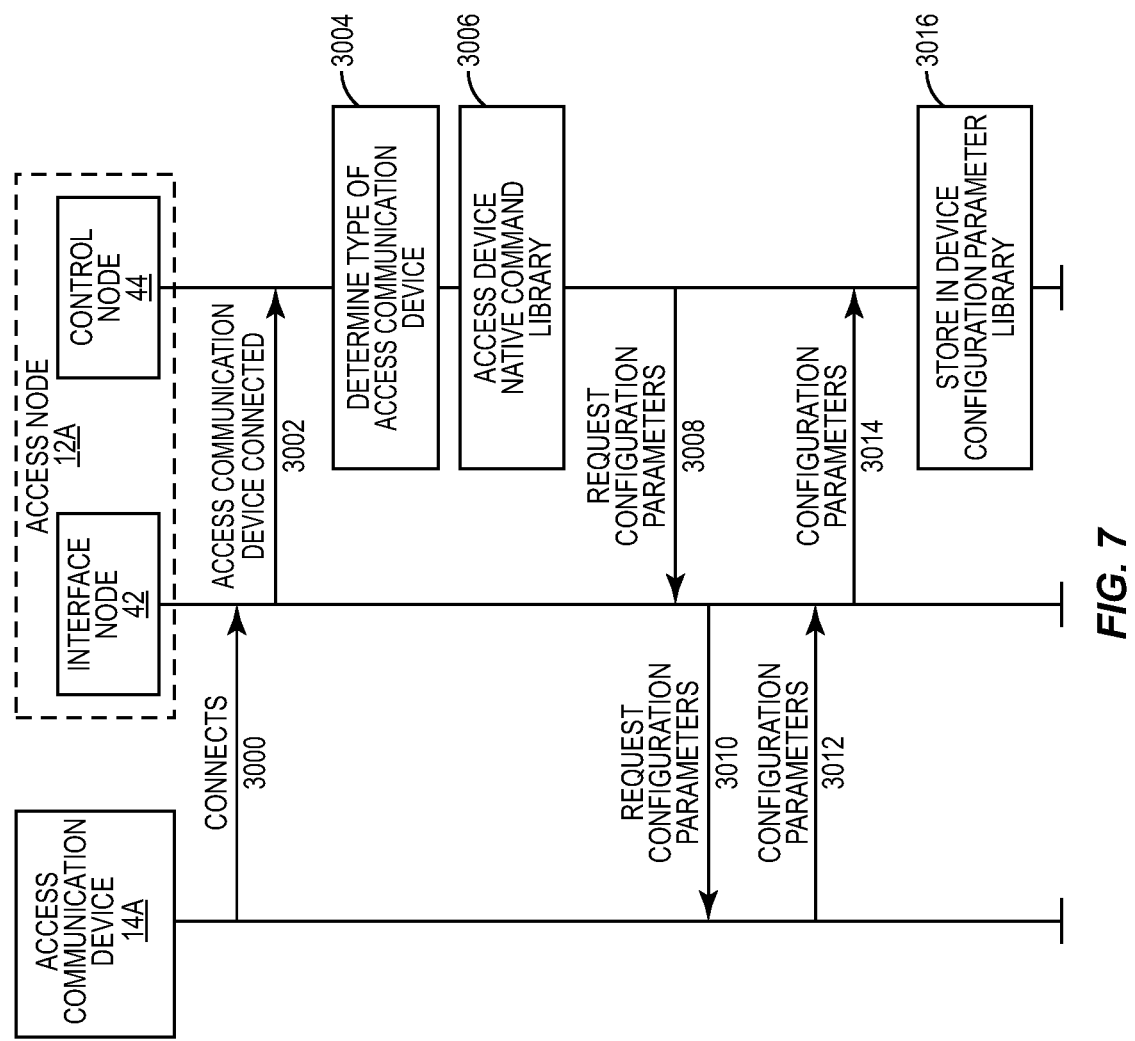
FIG. 7 is a message flow diagram illustrating an exemplary exchange of messages during the initial connection of an ACD to an access node.

FIG. 6 is an exemplary block diagram illustrating in greater detail control communications between the ACD 14A and an edge device 20. Devices and other elements depicted in FIGS. 1 and 2 that are not necessary for the discussion have been removed for ease of illustration. FIG. 7 is a message flow diagram illustrating an exemplary exchange of messages during the initial connection of the ACD 14A to the access node 12A. FIGS. 6 and 7 will be discussed in conjunction with one another. Referring first to FIG. 6, the control node 44 includes a device native command library 68 which contains ACD instructions that include information identifying native commands used by a respective ACD 14, and may also include information identifying a native command protocol for use with such commands. The device native command library 68 may comprise hundreds or thousands of records, each of which corresponds to a particular device type of ACD 14, and provides information that enables the control node 44 to communicate with an ACD 14. The information in the device native command library 68 may be determined experimentally, available publicly, or provided by the manufacturers of the ACDs 14.

Assume that the ACD 14A is initially connected to the interface node 42 (FIG. 7, step 3000). Such connection may be detected automatically by the interface node 42, or an operator may configure the interface node 42 to inform the interface node 42 that the ACD 14A has been connected to the interface node 42. The interface node 42 notifies the control node 44 that the ACD 14A is connected to the interface node 42 (FIG. 7, step 3002). In response, the control node 44 determines the type of device of the ACD 14A (FIG. 7, step 3004). This information may be contained in the message from the interface node 42 to the control node 44 that identifies the connection of the ACD 14A, may be separately configured into the control node 44, or may be determined after one or more handshake communications between the control node 44 and the ACD 14A (facilitated by the interface node 42). In one embodiment, the interface node 42 serves primarily as a passive communication path between the ACD 14A and the control node 44, such that the ACD 14A and the control node 44 essentially communicate directly with one another.

The control node 44 accesses the device native command library 68 based on the type of device of the ACD 14A, and obtains information including a native control protocol for use in the exchange of control signaling with the ACD 14A (FIG. 7, step 3006). The control node 44 generates a control command using the native control protocol requesting the current configuration parameters of the ACD 14A, and sends the control command to the ACD 14A via the interface node 42 (FIG. 7, steps 3008-3010).

In response, the ACD 14A generates a message identifying the configuration parameters of the ACD 14A, including the configuration parameter types, and corresponding configuration parameter values. The ACD 14A communicates this information to the control node 44 via the interface node 42 (FIG. 7, steps 3012-3014). The control node 44 also maintains a device configuration parameter library 70 for storing the device configuration parameters of each ACD 14 coupled to the interface node 42. The control node 44 stores the configuration parameters received from the ACD 14A in the device configuration parameter library 70 (FIG. 7, step 3016). In this manner, the control node 44 maintains, for each ACD 14 coupled to the interface node 42, configuration parameter information that identifies the current configuration of each such ACD 14.

Figure 8:
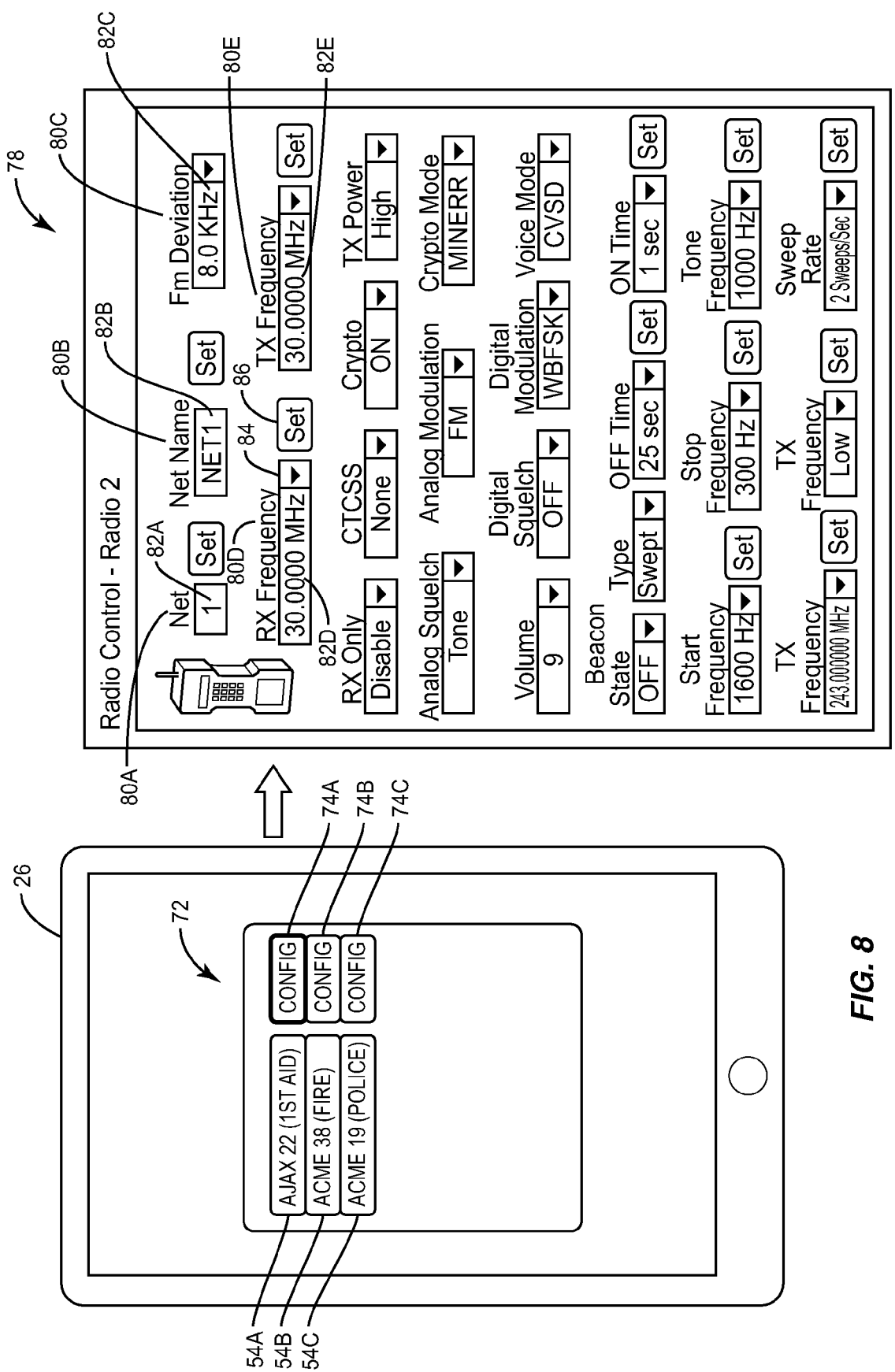
FIG. 8 is an exemplary user interface (UI) that may be used to facilitate programming, or retasking, of an ACD via an edge device.
Figure 9A:
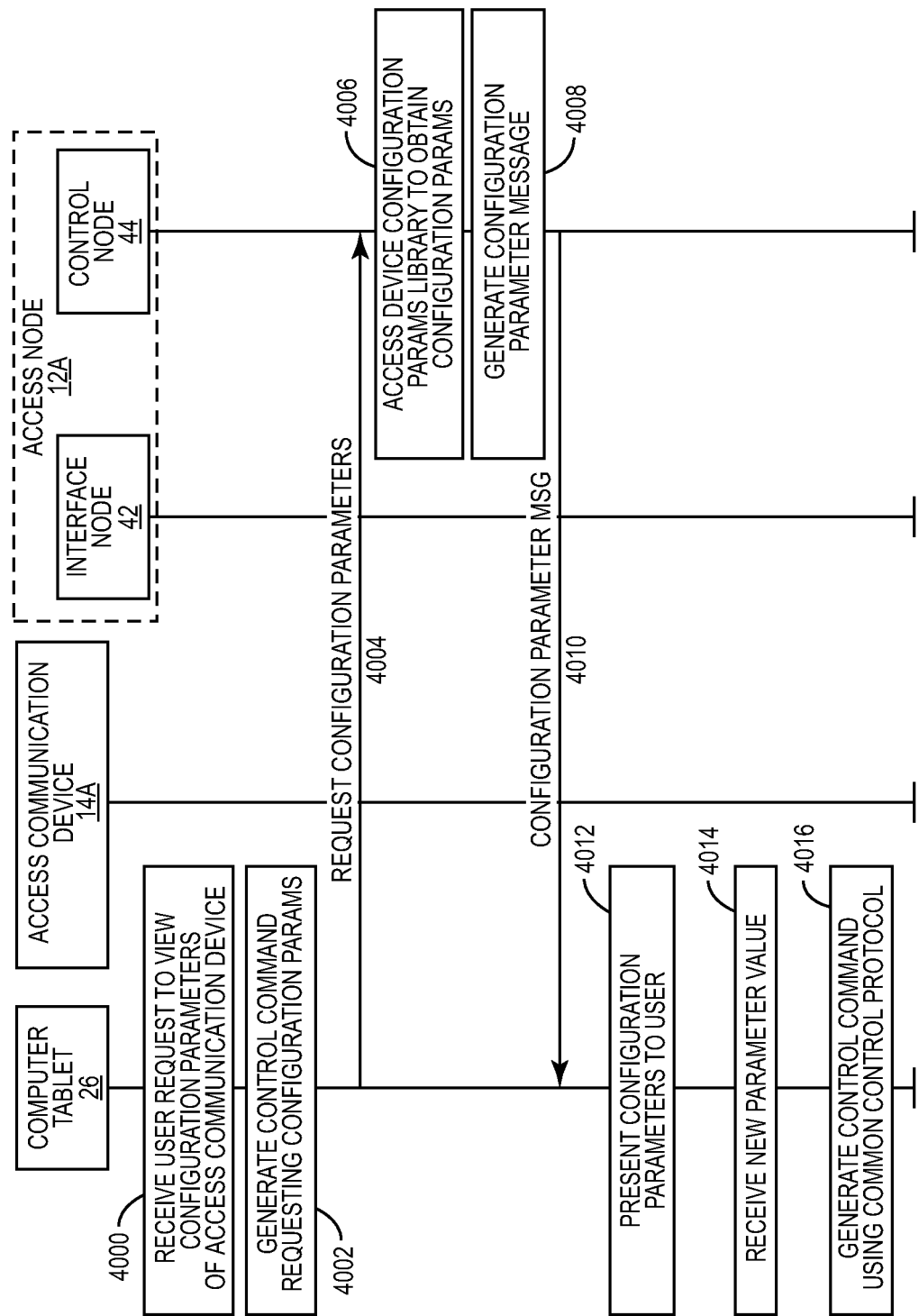
FIG. 9 is a message flow diagram illustrating an exemplary exchange of messages during the programming of an ACD via an edge device.
Figure 9B:
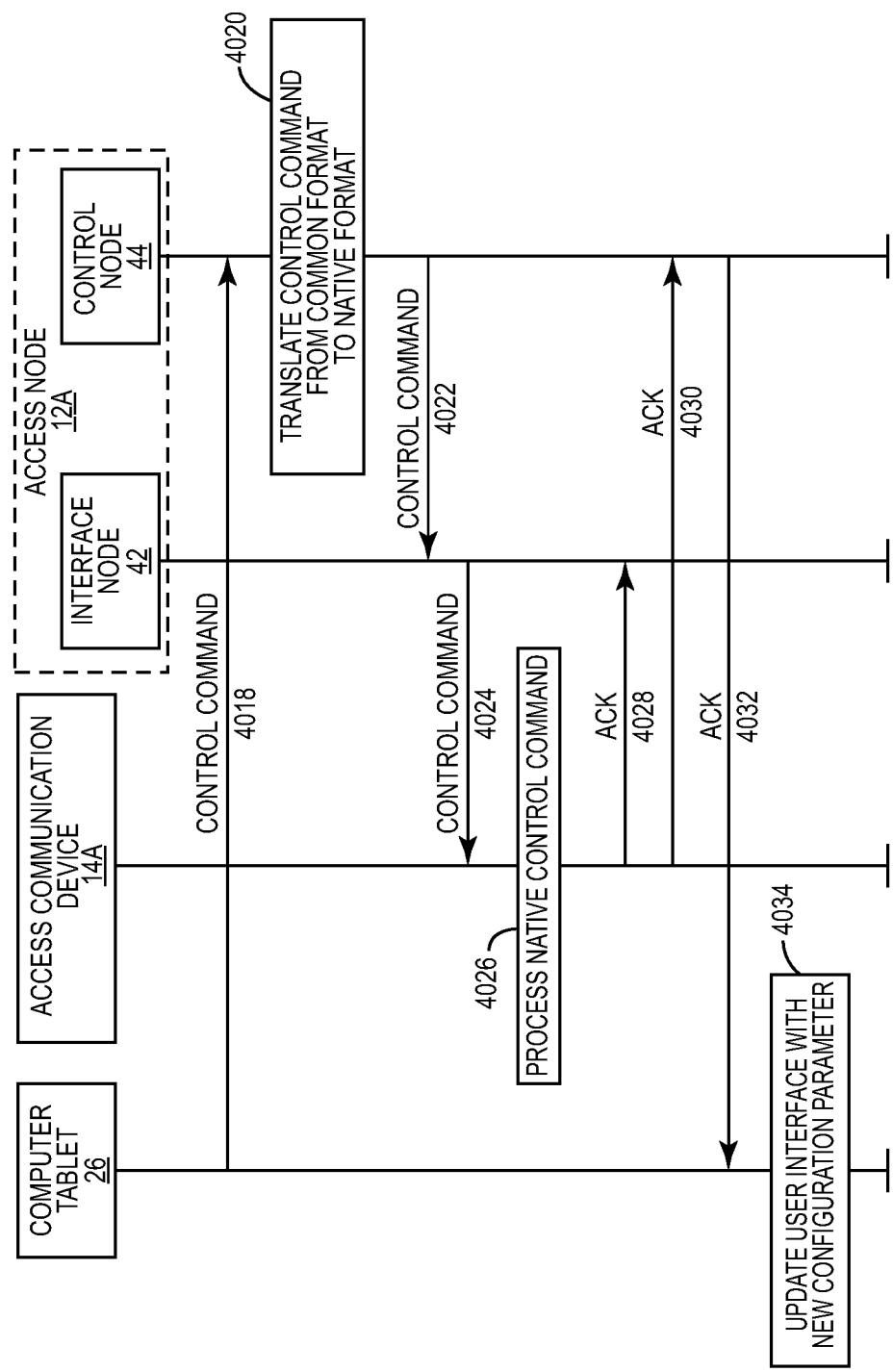

FIG. 8 is an exemplary user interface that may be used to facilitate programming, or retasking, of an ACD 14 via an edge device 20. FIG. 9 is a message flow diagram illustrating an exemplary exchange of messages during the programming of an ACD 14 via an edge device 20. FIGS. 8 and 9 will be discussed in conjunction with FIG. 6. Referring first to FIG. 8, assume that in response to user selection the client application executing on the computer tablet 26 presents a UI 72 that includes the ACD identifiers 54A-54C, each of which corresponds to a particular ACD 14, and corresponding user-selectable configuration buttons 74A-74C. Assume further that the user 40 selects the configuration button 74A to indicate a desire to view the configuration parameters associated with the ACD 14A. The computer tablet 26 receives the selection from the UI 72 that indicates that the user 40 wishes to view the configuration parameters of the ACD 14A (FIG. 9, step 4000).

In one embodiment, the communications platform utilizes a "common" control protocol to convey control information in a common format irrespective of a native command format of a particular ACD 14. Such control information may include, for example, configuration parameters that are stored in an ACD 14 and determine the operating characteristics of the ACD 14, as well as control commands that enable an edge device 20 to alter the configuration parameter values of the ACD 14.

When receiving configuration parameters about an ACD 14 from an access node 12, the use of the common control protocol allows a client application executing on an edge device 20 to interpret such configuration parameters irrespective of the native control format in which such information may be natively maintained by the ACD 14. When altering a configuration parameter of an ACD 14, the use of such a common control protocol enables an edge device 20 to send control commands to any ACD 14 by using the same common format irrespective of the native control commands associated with the ACD 14. In one embodiment, the common control protocol is implemented in an Extensible Markup Language (XML) format, although other protocols or markup languages may be suitable depending on the particular communication platform. Thus, the computer tablet 26 includes an XML function 76 (FIG. 6) which generates control commands in the common control protocol suitable for transmission to an access node 12, and which interprets control commands received from an access node 12. A command generated using the common control protocol may be referred to herein as a "common control command," to distinguish such command from a native control command associated with a particular ACD.

Upon receipt of the user request to view the configuration parameters of the ACD 14A, the XML function 76 generates a common control command in the common format using the common control protocol that requests the configuration parameters of the ACD 14A (FIG. 9, step 4002). The computer tablet 26 sends the common control command to the control node 44 (FIG. 9, step 4004). The control node 44 interprets the common control command, and accesses the device configuration parameter library 70, and obtains the configuration parameter information associated with the ACD 14A (FIG. 9, step 4006). The control node 44 formats the configuration parameters obtained from the device configuration parameter library 70 into a configuration parameter message using the common control protocol (FIG. 9, step 4008). The control node 44 sends the configuration parameter message to the computer tablet 26 via a unicast address, such as the IP address of the computer tablet 26 (FIG. 9, step 4010). The computer tablet 26 receives the configuration parameter message, extracts the configuration parameters from the configuration parameter message in accordance with the common control protocol, and presents such information to the user 40 via a UI 78 (FIG. 9, step 4012).

The UI 78 includes a plurality of configuration parameter types 80A-80E (generally, configuration parameter types 80), including, for example, a "Net" type 80A, a "Net Name" type 80B, an "FM Deviation" type 80C, a "RX Frequency" type 80D, and a "TX Frequency" type 80E. For purposes of illustration, only a few of the various configuration parameter types depicted in FIG. 8 are separately identified with element reference numerals. In proximity to each configuration parameter type 80A-80E is a configuration parameter value 82A-82E identifying the value associated with the corresponding configuration parameter type 80.

Assume that the user 40 desires to change the configuration parameter value 82D from 30 MHz to 42 MHz, to program the ACD 14A to begin receiving at a different frequency. The user 40 enters the value "42" into an input field 84, and selects a set button 86. The computer tablet 26 receives the user input indicating a value of "42" in association with the input field 84 (FIG. 9, step 4014). The XML function 76 generates a common control command in the common format using the common control protocol that identifies a new value of the receive frequency of 42 MHz (FIG. 9, step 4016). The computer tablet 26 sends the common control command to the control node 44 (FIG. 9, step 4018). The control node 44 receives the common control command, and translates the common control command into a native control command in the native format suitable for processing by the ACD 14A (FIG. 9, step 4020). The control node 44 then sends the native control command to the ACD 14A via the interface node 42 (FIG. 9, steps 4022-4024). The ACD 14A receives the native control command and processes the native control command to change the receive frequency to 42 MHz (FIG. 9, step 4026). The ACD 14A sends an acknowledgment (ACK) to the control node 44 via the interface node 42 acknowledging that the native control command was successful and that the receive frequency was changed to 42 MHz (FIG. 9, steps 4028-4030). The control node 44 sends an ACK to the computer tablet 26 indicating that the command was successful (FIG. 9, step 4032), which in turn may update the UI 78 by, for example, refreshing the UI 78 to indicate that the input field 84 now contains the value "42" rather than "30" (FIG. 9, step 4034).

Figure 10:
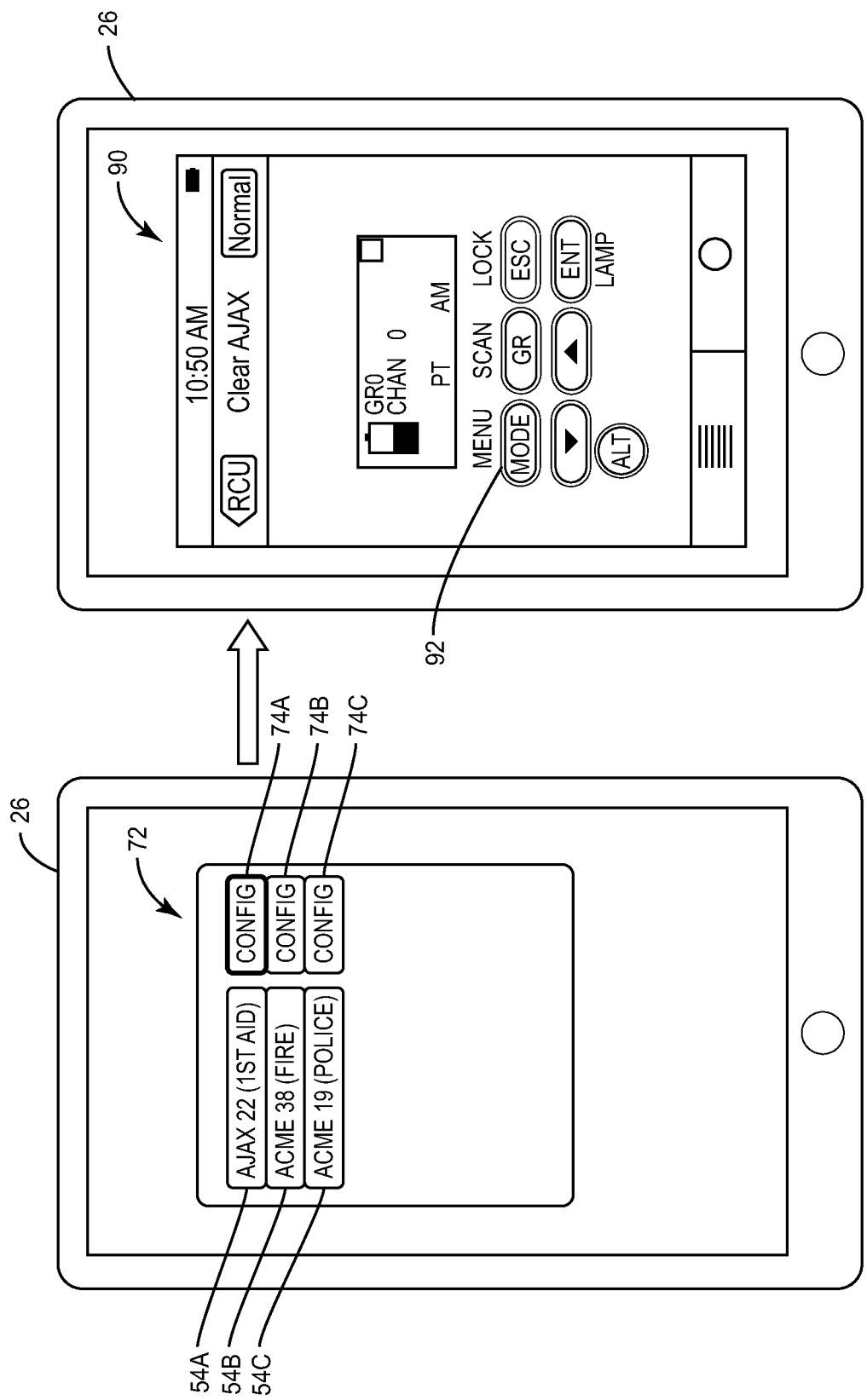
FIG. 10 illustrates a virtual radio UI for facilitating programming and otherwise controlling an ACD by an edge device according to another embodiment.

FIG. 10 illustrates a virtual radio user interface for facilitating reprogramming and otherwise controlling an ACD 14 by an edge device 20 according to another embodiment. In this embodiment, upon selection of the ACD identifier 54A by the user 40, the computer tablet 26 displays a UI 90 that includes a graphical depiction of the face of the type of ACD 14A. For example, assume that the ACD 14A comprises an AJAX Model 22 tactical radio. In response to the selection of the ACD identifier 54A, the computer tablet 26 presents a UI 90 which comprises actual digital imagery of the face of an AJAX Model 22 tactical radio. Assume further that the computer tablet 26 comprises a touch-sensitive surface. The user 40 may select a button 92 depicted in the UI 90, in the same manner that the user 40 would select the same button on an AJAX Model 22 tactical radio if the user 40 were holding an AJAX Model 22 tactical radio rather than the computer tablet 26. The computer tablet 26 detects the touch of the user 40, and correlates the location of the touch with the imagery of the face of the AJAX Model 22 tactical radio depicted in the UI 90, and thereby determines that the user has touched the button 92.

The XML function 76 generates a control command in the common format using the common control protocol indicating that the corresponding button 92 has been depressed, and sends the control command to the access node 12A. The access node 12A receives the control command, translates the control command from the common format to the native format associated with the ACD 14A, and sends the natively formatted control command to the ACD 14A. The ACD 14A receives the control command, and processes the control command as if the user 40 had physically depressed the same button on the ACD 14A. An acknowledgement indicating the successful processing of the command may be communicated by the access node 12A to the computer tablet 26 (via the access node 12A). If the processing of the control command resulted in a change in configuration parameters, or would result in information being displayed on the face of the ACD 14A, such information may be communicated to the computer tablet 26 (via the access node 12A). Such information may then be displayed in the user interface 90, such that the user 40 perceives the precise information the user 40 would perceive if the user 40 were holding the ACD 14A rather than the computer tablet 26. Such virtual radio functionality allows an individual familiar with various types of ACDs 14 to interface with any ACD 14 from any location on earth via an edge device 20 in an intuitive manner, as if the user 40 were physically manipulating the particular ACD 14.

Figure 11:
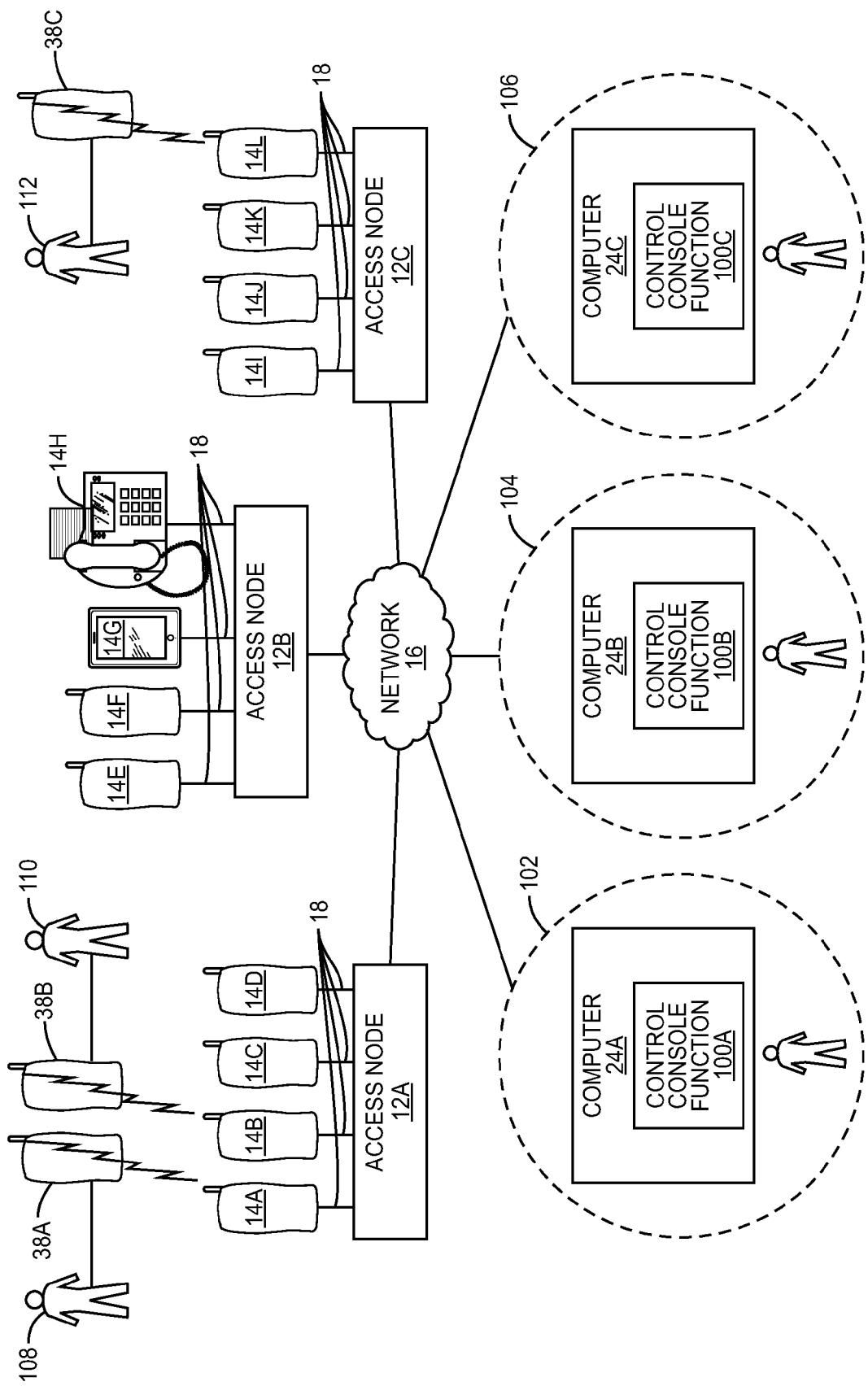
FIG. 11 is another high-level block diagram of an exemplary system in which embodiments may be practiced.

FIG. 11 is a high-level block diagram of an exemplary system similar to that disclosed in FIG. 1, except certain edge devices 20 have been omitted to facilitate discussion of a control console function of the distributed communication platform. In one embodiment, one or more edge devices 20, such as computers 24A-24C, may each comprise a respective control console function 100A-100C (generally, control console function 100). A computer 24, as discussed above, may comprise a laptop computer, a workstation, or the like. The control console function 100 includes much of the functionality discussed above with respect to FIGS. 6-9 regarding the ability to control, or reprogram, one or more ACDs 14, and for the sake of brevity, the details of such discussion will not be repeated here. As discussed above, the control console function 100 preferably utilizes an XML processing function which is capable of generating control commands in a common format using the common control protocol, and issuing such control commands to one or more access nodes 12 in order to reprogram one or more ACDs 14.

Among other features, the control console function 100 permits an operator to patch together any number of ACDs 14, irrespective of their respective transmit and receive frequencies, into a communication session such that voice communications between such ACDs 14 are facilitated. The control console function 100 also permits an operator to concurrently alter, or reprogram, configuration parameters of multiple ACDs 14 simultaneously.

In one embodiment, the control console function 100 may execute on any edge device 20, such as a computer 24, where a network connection is available. The distributed communication platform also allows multiple control console functions 100 to operate simultaneously. For example, assume an emergency situation where a number of different governmental agencies share responsibility for responding. In particular, a federal agency 102, a state agency 104, and a city agency 106 each has responsibility for different aspects of a response. The federal agency 102 may control one or more ACD 14 via the control console function 100A executing on the computer 24A, the state agency 104 may control one or more ACDs 14 via the control console function 100B executing on the computer 24B, and the city agency 106 may control one or more ACDs 14 via the control console function 100C executing on the computer 24C. Notably, as long as the corresponding computer 24 has network connectivity, the agencies 102, 104, and 106 may be physically present at the scene of the emergency, or may be remote. Thus, for example, an emergency situation may have responding personnel physically at the scene of the emergency while communications among such personnel are controlled from a control console function 100 that is hundreds or thousands of miles away.

In one embodiment, the control console function 100 enables an operator to patch any one or more ACDs 14 into the same communication session. The control console function 100 may provide a UI that depicts an icon for each ACD 14 coupled to an access node 12. Such information may be programmed into the control console function 100 manually, or may be determined by the control console function 100 via an exchange with a designated server that tracks access nodes 12 and ACDs 14 connected to such access nodes 12, for example. The operator may select multiple ACDs 14 via the UI, and may indicate a desire to patch such ACDs 14 into a communication session. For example, assume that there is a desire for a user 108 who is operating the remote radio 38A to communicate with a user 110 who is operating a remote radio 38B, as well as with a user 112 who is operating a remote radio 38C. The remote radios 38A, 38B, and 38C may be miles from one another, made by different manufacturers, and operate on different receive and transmit frequencies. The operator identifies at the control console function 100 the three remote radios 38A, 38B, and 38C. For example, the control console function 100 may depict icons on the UI that correspond to each of the ACDs 14A-14L. The operator then indicates a desire to patch the three remote radios 38A, 38B, and 38C into a communication session. In response, the control console function 100 generates a first control command that directs the access node 12A to subscribe to the multicast addresses associated with the ACD 14L, and to provide the audio signal from such packetized voice streams to the ACDs 14A and 14B. The control console function 100 generates a second control command that directs the access node 12C to subscribe to the multicast addresses associated with the ACDs 14A and 14B, and to provide the audio signals from such packetized voice streams to the ACD 14L.

In response, the access node 12A begins to subscribe to the multicast address associated with the ACD 14L. Upon receipt of a packetized voice stream addressed to the multicast address associated with the ACD 14L, the access node 12A decodes the packetized voice stream, extracts the audio signals, encodes the audio signals into a first audio signal suitable for receipt by the ACD 14A and into a second audio signal suitable for receipt by the ACD 14B, and communicates the first and second audio signals to the ACDs 14A and 14B, respectively. The ACDs 14A, 14B provide such audio signals over the air to the remote radios 38A and 38B, respectively, thus enabling the users of the remote radios 38A and 38B to hear communications from the user of the remote radio 38C.

A similar process occurs on the access node 12C, wherein the access node 12C subscribes to the multicast addresses associated with the ACDs 14A and 14B. Upon receipt of a packetized voice stream from either such multicast address, the access node 12C decodes the packetized voice stream, extracts the audio signals, encodes the audio signals into a third audio signal suitable for receipt by the ACD 14L, and communicates the third audio signal to the ACD 14L, thus enabling the user 112 to hear communications of the users 108 and 110. The access node 12A, upon receiving an audio signal from the ACD 14A, generates both a packetized voice stream for transmission to the multicast address associated with the ACD 14A, as described above, and also translates the audio signal, if necessary, from the format received by the ACD 14A to a native format suitable for the ACD 14B. Thus, where two ACDs coupled to the same access node 12 are patched into a communication session, the respective access node 12 may perform suitable signal format translation as appropriate.

The control console function 100 can also reprogram multiple ACDs 14 concurrently, eliminating the time-consuming process of manually reprogramming radios during an emergency situation. Assume, for example, that the federal agency 102 arrives at an emergency scene and couples the ACD 14A to the access node 12A, the ACD 14E to the access node 12B, and the ACD 14I to the access node 12C. Assume further that it is determined that the ACDs 14A, 14E, and 14I are each programmed to operate on a same receive and transmit frequency as other ACDs 14 associated with the state agency 104, and which are already coupled to a respective access node 12 and are in operation. An operator at the control console function 100A selects each of the ACDs 14A, 14E, and 14I. The operator then indicates that each such radio should be reprogrammed, or retasked, to operate at a particular receive frequency and a particular transmit frequency that is different from the receive and transmit frequencies being used by the state agency 104. The control console function 100A determines that the ACD 14A is connected to the access node 12A, the ACD 14E is connected to the access node 12B, and the ACD 14I is connected to the access node 12C. The control console function 100A generates a first control command using the common control protocol that indicates that the receive frequency configuration parameter value of the ACD 14A should be changed to the identified receive frequency, and the transmit frequency configuration parameter value of the ACD 14A should be changed to the identified transmit frequency. The computer 24A communicates the first control command to the access node 12A. Upon receipt, as discussed above with respect to FIGS. 6-9, the access node 12A receives the control command, accesses the device native command library 68 to determine the native command protocol associated with the ACD 14A, and generates one or more control commands in the native format that direct the ACD 14A to set the value of the receive frequency configuration parameter to the identified receive frequency, and to set the value of the transmit frequency configuration parameter to the identified transmit frequency. The access node 12A communicates the control command(s) in the native format to the ACD 14A. The ACD 14A receives the control command(s), processes the control command(s), and changes its receive and transmit frequencies to the identified receive and transmit frequencies.

Second and third control commands are similarly sent to the access nodes 12B and 12C to cause the ACDs 14E and 14I, respectively, to change their respective receive and transmit frequencies to the identified receive and transmit frequencies. In this manner, an operator can easily, intuitively, and quickly reprogram, or retask, a number of ACDs 14 practically simultaneously. While receive and transmit frequency configuration parameters have been discussed for purposes of illustration, the control console function 100 can alter any programmable configuration parameter associated with any ACD 14.

In another embodiment, the control console function 100 may rekey one or more ACDs 14 to alter a key used for encrypted communications. For example, the operator may determine that the key used for encrypted communications by the ACDs 14A, 14E, and 14I may have been compromised, permitting interception of radio transmissions from such ACDs 14A, 14E, and 14I. The operator may select the ACDs 14A, 14E, and 14I identify a new key for encryption purposes. In response, the control console function 100A generates a rekey command in the common format using the common control protocol directing the ACDs 14A, 14E, and 14I to use the new key for encryption purposes, and sends the command to the access nodes 12A, 12B, and 12C, as described above. The access nodes 12A, 12B, and 12C generate rekey control commands in the native formats suitable for the ACDs 14A, 14E, and 14I, respectively, and communicate such rekey commands to the ACDs 14A, 14E, and 14I, which in turn process the respective commands and thereby change the keys used for encryption.

Figure 12:
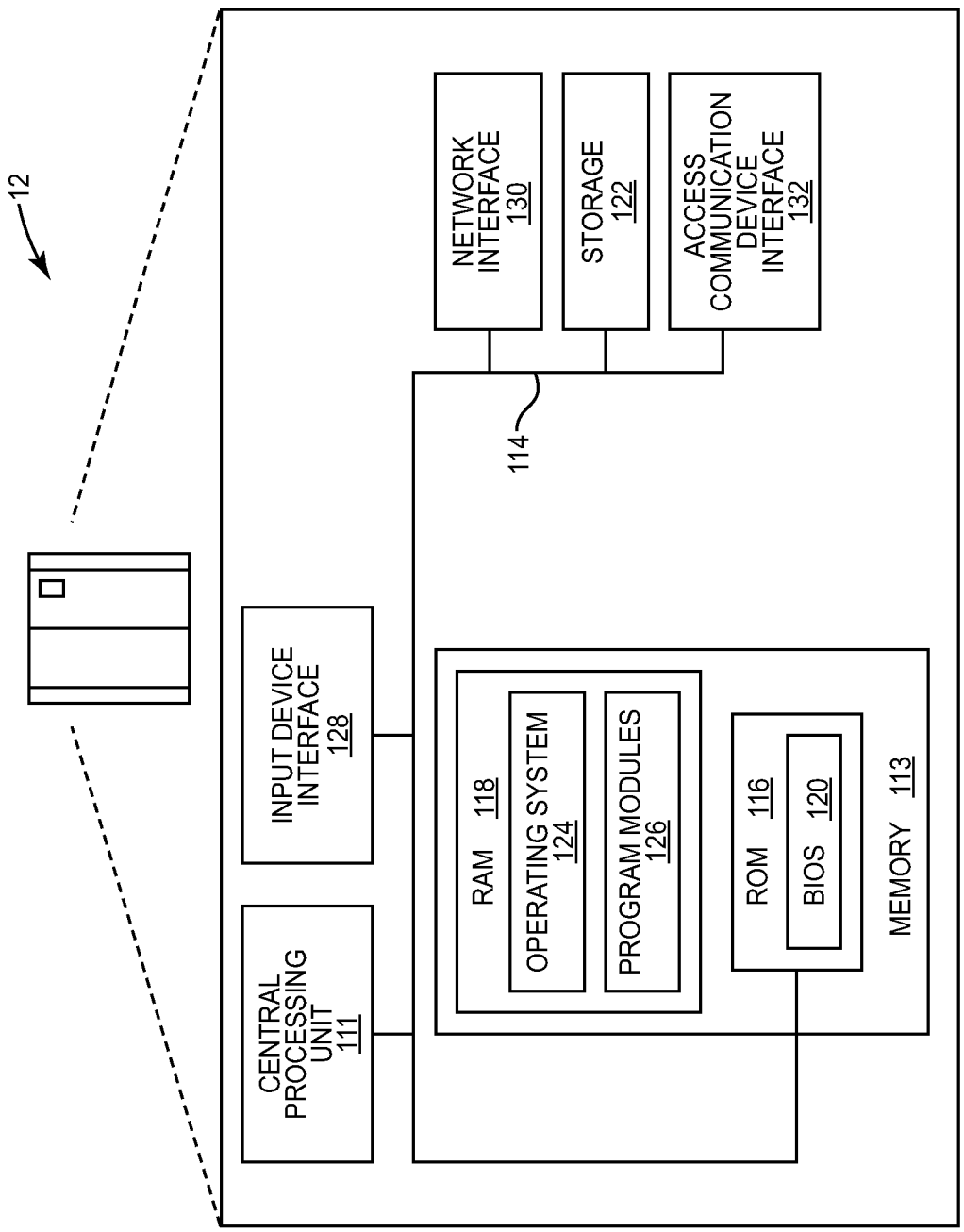
FIG. 12 is a block diagram of an access node according to one embodiment.

FIG. 12 is a block diagram of an exemplary access node 12 (FIG. 1) according to one embodiment. The access node 12 may comprise, for example, a processing device that includes a processor, such as a central processing unit 111; a system memory 113; and a system bus 114. The system bus 114 provides an interface for system components including, but not limited to, the system memory 113 and the central processing unit 111. The central processing unit 111 can be any of various commercially available or proprietary processors. Dual microprocessors and other multi-processor architectures may also be employed as the central processing unit 111.

The system bus 114 may be any of several types of bus structures that may further interconnect to a memory bus (with or without a memory controller), a peripheral bus, and/or a local bus using any of a variety of commercially available bus architectures. The system memory 113 may include non-volatile memory 116 (e.g., read only memory (ROM), erasable programmable read only memory (EPROM), electrically erasable programmable read only memory (EEPROM), etc.) and/or volatile memory 118 (e.g., random access memory (RAM)). A basic input/output system (BIOS) 120 may be stored in the non-volatile memory 116, and can include the basic routines that help to transfer information between elements within the access node 12. The volatile memory 118 may also include a high-speed RAM such as static RAM for caching data.

The access node 12 may further include a computer-readable storage 122, which may comprise, for example, an internal hard disk drive (HDD) (e.g., enhanced integrated drive electronics (EIDE) or serial advanced technology attachment (SATA)) for storage, flash memory, or the like. The device native command library 68 and the device configuration parameter library 70 (FIG. 6) may be stored in the computer-readable storage 122, for example. The drives and associated computer-readable and computer-usable media provide non-volatile storage of data, data structures, computer-executable instructions, and so forth. Although the description of computer-readable media above refers to an HDD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods of the disclosed architecture.

A number of program modules can be stored in the computer-readable storage 122 and in the volatile memory 118, including an operating system 124 and one or more program modules 126, which may implement the functionality described herein in whole or in part, including, for example, functionality described with respect to the generation of packetized voice streams, translation of commands from the common format to a native format associated with an ACD 14, and other processing and functionality described herein. It is to be appreciated that the embodiments can be implemented with various commercially available operating systems 124 or combinations of operating systems 124.

All or a portion of the embodiments may be implemented as a computer program product stored on a non-transitory computer-usable or computer-readable medium, such as the storage 122, and including instructions configured to cause the central processing unit 111 to carry out the steps described herein. Thus, the computer-readable program code can comprise software instructions for implementing the functionality of the embodiments described herein when executed on the central processing unit 111. The central processing unit 111, in conjunction with the program modules 126 in the volatile memory 118, may serve as a control system for the access node 12 that is configured to, or adapted to, implement the functionality described herein.

An administrator may be able to enter commands and information into the access node 12 through one or more input devices, such as, for example, a keyboard (not illustrated); or a pointing device, such as a mouse (not illustrated). Other input devices (not illustrated) may include a microphone, an infrared (IR) remote control, a joystick, a game pad, a stylus pen, or the like. In one embodiment, the access node 12 includes a front panel comprising one or more buttons and LCD displays to enable configuration of aspects of the access node 12. These and other input devices may be connected to the central processing unit 111 through an input device interface 128 that is coupled to the system bus 114, but can be connected by other interfaces such as a parallel port, an IEEE 1394 serial port, a universal serial bus (USB) port, an IR interface, etc.

The access node 12 also includes a network interface 130 for communicating with the network 16 (FIG. 1), which may comprise, for example, a wired or wireless network interface. The access node 12 also includes one or more ACD interfaces 132 which are used to couple ACDs 14 to the access node 12. Such ACD interfaces 132 may comprise, for example, a serial interface such as an RS-232 interface, or any other direct-connect interface suitable for connecting directly to an ACD 14.

Figure 13:
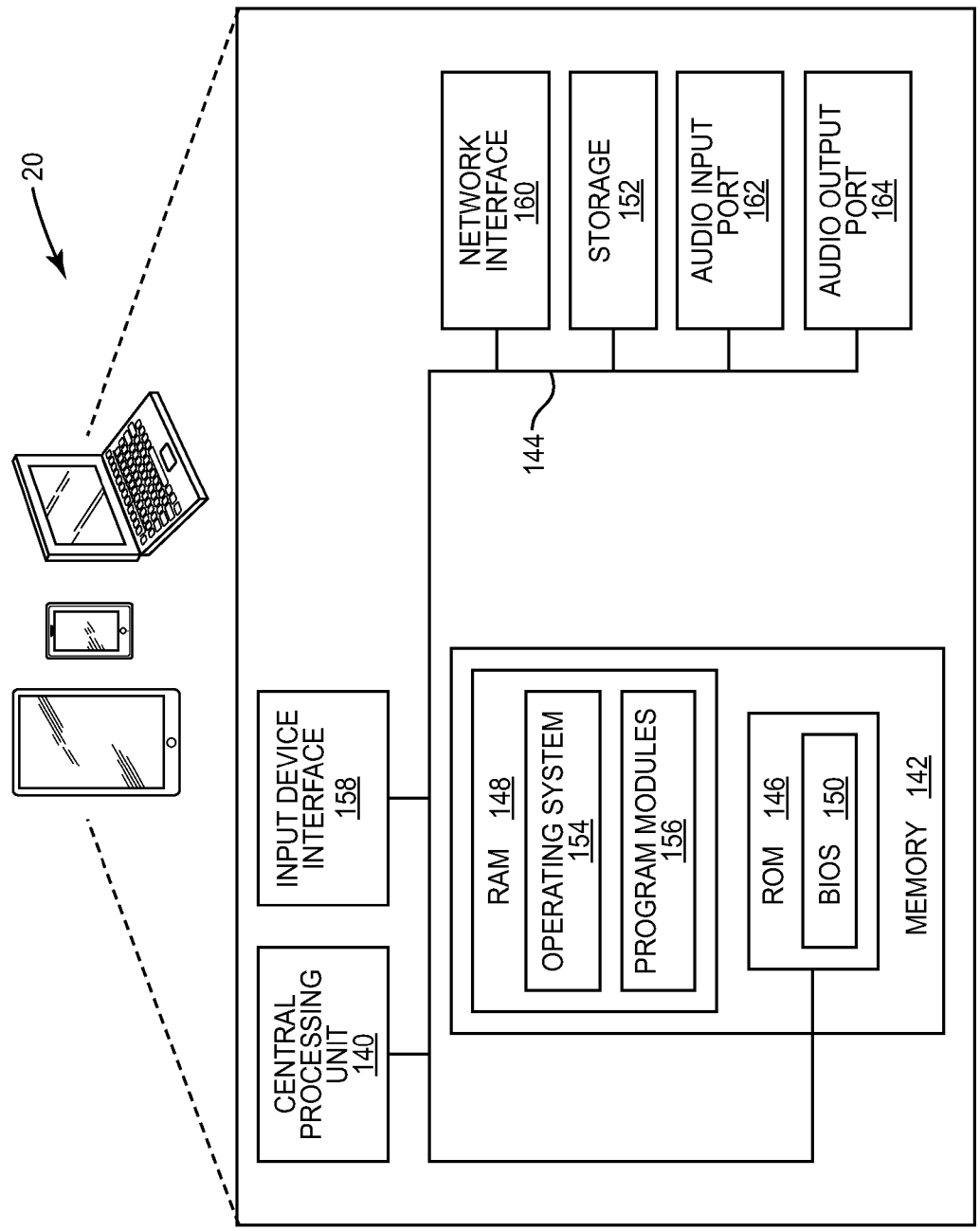
FIG. 13 is a block diagram of an edge device according to one embodiment.

FIG. 13 is a block diagram of an edge device 20 (FIG. 1) according to one embodiment. As noted previously, an edge device 20 may comprise any suitable computing device capable of being coupled to the network 16 and executing one or more applications that implement the functionality described herein, and may include for example, the SIP telephone 22, the computer 24, the computer tablet 26, or the smartphones 28, 30. Thus, FIG. 13 identifies common components which may be found in such devices, and may be used to implement an edge device 20 as discussed herein. In particular the edge device 20 includes a processor, such as a central processing unit 140; a system memory 142; and a system bus 144. The system bus 144 provides an interface for system components including, but not limited to, the system memory 142 and the central processing unit 140. The central processing unit 140 can be any of various commercially available or proprietary processors. Dual microprocessors and other multi-processor architectures may also be employed as the central processing unit 140.

The system bus 144 may be any of several types of bus structures that may further interconnect to a memory bus (with or without a memory controller), a peripheral bus, and/or a local bus using any of a variety of commercially available bus architectures. The system memory 142 may include non-volatile memory 146 (e.g., ROM, EPROM, EEPROM, etc.) and/or volatile memory 148 (e.g., RAM). A BIOS 150 may be stored in the non-volatile memory 146, and can include the basic routines that help to transfer information between elements within the edge device 20. The volatile memory 148 may also include a high-speed RAM such as static RAM for caching data.

The edge device 20 may further include a computer-readable storage 152, which may comprise, for example, an internal HDD (e.g., EIDE or SATA) for storage, flash memory, or the like. The drives and associated computer-readable and computer-usable media provide non-volatile storage of data, data structures, computer-executable instructions, and so forth. Although the description of computer-readable media above refers to an HDD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods of the disclosed architecture.

A number of program modules can be stored in the computer-readable storage 152 and in the volatile memory 148, including an operating system 154 and one or more program modules 156, which may implement the functionality described herein in whole or in part, including, for example, functionality described with respect to the UI 52, the codec 66, and the XML function 76, and other processing and functionality described herein. It is to be appreciated that the embodiments can be implemented with various commercially available operating systems 154 or combinations of operating systems 154.

All or a portion of the embodiments may be implemented as a computer program product stored on a non-transitory computer-usable or computer-readable medium, such as the storage 152, and including instructions configured to cause the central processing unit 140 to carry out the steps described herein. Thus, the computer-readable program code can comprise software instructions for implementing the functionality of the embodiments described herein when executed on the central processing unit 140. The central processing unit 140, in conjunction with the program modules 156 in the volatile memory 148, may serve as a control system for the edge device 20 that is configured to, or adapted to, implement the functionality described herein.

A user 40 may be able to enter commands and information into the edge device 20 through one or more input devices, such as, for example, a keyboard (not illustrated); a pointing device, such as a mouse (not illustrated); or a touch-sensitive surface. Other input devices may include a microphone, an IR remote control, a joystick, a game pad, a stylus pen, or the like. These and other input devices may be connected to the central processing unit 140 through an input device interface 158 that is coupled to the system bus 144, but can be connected by other interfaces such as a parallel port, an IEEE 1394 serial port, a USB port, an IR interface, etc.

The edge device 20 also includes a network interface 160 for communicating with the network 16 (FIG. 1), which may comprise, for example a wired or wireless network interface. The edge device 20 also includes an audio input port 162 which may be coupled to, for example, an integral or separate microphone, which allows the edge device 20 to receive audio input, such as a user's voice signals. The edge device 20 also includes an audio output port 164 which may be coupled to, for example, an integral or separate speaker, which allows the edge device 20 to provide audio output, such as a packetized voice stream, to a user 40.

Those skilled in the art will recognize improvements and modifications to the preferred embodiments of the present disclosure. All such improvements and modifications are considered within the scope of the concepts disclosed herein and the claims that follow.

What is claimed is:

1. An access node, comprising:
   a first access communication device (ACD) interface configured to communicate via a first audio channel with a first ACD and via a first control channel with the first ACD;
   a network interface configured to communicate with a network; and
   a processor configured to:
   receive first incoming audio signals from the first ACD via the first audio channel;
   generate a first outgoing packetized voice stream based on the first incoming audio signals;
   multicast the first outgoing packetized voice stream over the network;
   in response to multicasting the first outgoing packetized voice stream, receive a first incoming packetized voice stream from a first edge device via the network interface;
   generate first outgoing audio signals based on the first incoming packetized voice stream; and
   provide the first outgoing audio signals to the first ACD via the first audio channel.

2. The access node of claim 1, wherein the first ACD interface comprises a first audio channel interface and a first control channel interface.

3. The access node of claim 2, wherein the first audio channel is established via the first audio channel interface over an audio communication link, and the first control channel is established via the first control channel interface over a control communication link, and wherein the audio communication link is a different communication link from the control communication link.

4. The access node of claim 3, wherein the first audio channel interface comprises an analog audio channel interface, and the first control channel interface comprises a serial control channel interface.

5. The access node of claim 4, wherein the first audio channel interface couples to the first ACD via an analog audio communication link and the first control channel interface couples to the first ACD via an RS-232 communication link.

6. The access node of claim 5, wherein the analog audio communication link is configured to couple to the first ACD via an analog audio port of the first ACD.

7. The access node of claim 1, where the processor is further configured to:
   establish a control communication session with the first edge device;
   receive a control command from the first edge device; and
   communicate the control command to the first ACD via the first control channel.

8. The access node of claim 1, wherein the access node further comprises a second ACD interface configured to communicate via a second audio channel with a second ACD and a via second control channel with the second ACD, and wherein the processor is further configured to:
   receive second incoming audio signals from the second ACD via the second audio channel;
   generate a second outgoing packetized voice stream based on the second incoming audio signals;
   multicast the second outgoing packetized voice stream over the network;

in response to multicasting the second outgoing packetized voice stream, receive a second incoming packetized voice stream from a second edge device via the network interface;

generate second outgoing audio signals based on the second incoming packetized voice stream; and provide the second outgoing audio signals to the second ACD via the second audio channel.

9. The access node of claim 8, wherein the first outgoing packetized voice stream is multicast to a first multicast address associated with the first ACD, and the second outgoing packetized voice stream is multicast to a second multicast address associated with the second ACD, the first multicast address being different from the second multicast address.

10. The access node of claim 8, wherein the first ACD comprises a first radio frequency (RF) radio and the second ACD comprises a second RF radio, the first RF radio being a different radio type than the second RF radio.

11. An edge device, comprising:
a network interface adapted to communicate with a network;
an audio output port;
an audio input port; and
a processor configured to:
establish a control communication session with an access node via a unicast address associated with the access node;
receive, from the access node, a first incoming packetized voice stream via a first multicast address associated with a first access communication device (ACD), the first ACD being connected to the access node;
render the first incoming packetized voice stream to the audio output port;
receive audio signals of a user via the audio input port;
generate a first outgoing packetized voice stream comprising a plurality of packets, wherein the plurality of packets is addressed to the first multicast address; and
transmit the first outgoing packetized voice stream onto the network for receipt by the access node and communication to the first ACD.

12. The edge device of claim 11, wherein prior to receiving, from the access node, the first incoming packetized voice stream, the processor is further configured to:
present a user interface (UI) to the user, the UI comprising a plurality of device identifiers, each of the device identifiers identifying one of a plurality of ACDs including the first ACD, each of the plurality of ACDs having a corresponding multicast address associated therewith;
receive, via the UI, input identifying a first selected device identifier of the plurality of device identifiers, wherein the first selected device identifier corresponds to the first ACD;
determine the first multicast address associated with the first ACD; and
monitor the first multicast address.

13. The edge device of claim 12, wherein the edge device is further configured to:
receive, via the UI, second input identifying a second selected device identifier of the plurality of device identifiers, wherein the second selected device identifier corresponds to a second ACD connected to the access node;
determine a second multicast address associated with the second ACD;
monitor the second multicast address; and
receive, from the access node, a second incoming packetized voice stream via the second multicast address.

14. The edge device of claim 13, wherein the processor is further configured to:
receive second audio signals of the user via the audio input port;
generate a second outgoing packetized voice stream comprising a plurality of packets, wherein the plurality of packets is addressed to the second multicast address; and
transmit the second outgoing packetized voice stream onto the network for receipt by the access node and communication to the second ACD.

15. The edge device of claim 11, wherein the processor is further configured to:
generate a control command to alter a configuration parameter value of a configuration parameter of the first ACD; and
send the control command to the access node via the control communication session for communication to the first ACD.

16. The edge device of claim 11, wherein the processor is further configured to:
receive from the access node a plurality of configuration parameter values associated with the first ACD;
present, in a user interface (UI), the plurality of configuration parameter values in association with corresponding configuration parameters associated with the first ACD;
receive, via user input, a different configuration parameter value for one of the corresponding configuration parameters;
generate a control command to set the one of the corresponding configuration parameters to the different configuration parameter value; and
communicate the control command via the control communication session to the access node for transmission to the first ACD.

17. The edge device of claim 16, wherein the UI comprises digital imagery depicting a front of the first ACD.

18. The edge device of claim 11, wherein the edge device comprises a touch-sensitive surface, the processor further configured to:
present, in a user interface (UI), digital imagery depicting a front of the first ACD, the digital imagery including a plurality of buttons;
detect a touch of the user on the touch-sensitive surface at a location corresponding to one of the plurality of buttons in the digital imagery;
generate a control command indicating a depression of the one of the plurality of buttons; and
send the control command to the access node via the control communication session for presentation to the first ACD.

19. The edge device of claim 18, wherein the processor is further configured to:
receive an acknowledgment from the access node that the first ACD processed the control command; and
in response to the acknowledgment, update the UI to indicate to the user that the first ACD processed the control command.

20. The edge device of claim 19, wherein the edge device comprises one of a session initiation phone (SIP) phone, a computer tablet, and a smartphone.

21. An access node, comprising:
an access communication device (ACD) interface configured to establish an analog audio channel with an ACD and a control channel with the ACD;
a network interface configured to communicate with a network; and
a processor configured to:

receive incoming analog audio signals from the ACD via the analog audio channel, translate the incoming audio signals into an outgoing packetized voice stream, and multicast the outgoing packetized voice stream onto the network via the network interface;

receive an incoming packetized voice stream from an edge device addressed to a multicast address associated with the ACD, translate the incoming packetized voice stream into outgoing analog audio signals, and communicate the outgoing analog audio signals to the ACD via the analog audio channel;

establish a control communication session with the edge device;

receive a control command from the edge device via the control communication session, the control command including a configuration parameter value that corresponds to a configuration parameter of the ACD; and communicate the control command to the ACD via the control channel.

22. An access node, comprising:

an access communication device (ACD) interface configured to establish an analog audio channel with an ACD and a control channel with the ACD; and a processor configured to:

translate incoming analog audio signals received from the ACD via the analog audio channel into outgoing packetized voice streams for multicast transmission onto a network;

translate incoming packetized voice streams received from an edge device via a multicast address into outgoing analog audio signals for transmission to the ACD via the analog audio channel; and establish a control communication session with the edge device via which, in conjunction with the control channel, configuration parameters and configuration parameters values may be exchanged between the ACD and the edge device.

* * * * *